(12) United States Patent
Pahlevaninezhad et al.

(10) Patent No.: US 12,305,817 B2
(45) Date of Patent: May 20, 2025

(54) LIGHT-EMITTING APPARATUS USING METASURFACES AND LIGHT-EMITTING METHOD THEREOF

(71) Applicant: 10644137 CANADA INC., Calgary (CA)

(72) Inventors: Hamid Pahlevaninezhad, Calgary (CA); Aria Moaven, Calgary (CA); Majid Pahlevaninezhad, Calgary (CA); Sam Scherwitz, Calgary (CA)

(73) Assignee: 10644137 CANADA INC., Calgary (CA)

( * ) Notice: Subject to any disclaimer, the term of this patent is extended or adjusted under 35 U.S.C. 154(b) by 0 days.

(21) Appl. No.: 18/412,002

(22) Filed: Jan. 12, 2024

(65) Prior Publication Data

US 2024/0151371 A1    May 9, 2024

Related U.S. Application Data

(63) Continuation of application No. 17/620,659, filed as application No. PCT/CA2020/050849 on Jun. 18, 2020, now Pat. No. 11,892,130.

(Continued)

(51) Int. Cl.
| | |
|---|---|
| *F21K 9/68* | (2016.01) |
| *A01G 9/24* | (2006.01) |
| *F21K 9/65* | (2016.01) |
| *F21V 5/00* | (2018.01) |
| *F21V 7/00* | (2006.01) |

(Continued)

(52) U.S. Cl.
CPC ............... *F21K 9/68* (2016.08); *F21K 9/65* (2016.08); *F21V 5/002* (2013.01); *F21V 7/0083* (2013.01); *F21V 7/06* (2013.01); *F21V 9/14* (2013.01); *G02B 1/002* (2013.01); *H04N 13/337* (2018.05); *A01G 9/249* (2019.05); *F21Y 2105/16* (2016.08); *F21Y 2115/10* (2016.08)

(58) Field of Classification Search
CPC ........... F21K 9/68; F21K 9/65; H04N 13/227; F21V 5/002; F21V 7/0083; F21V 7/06; F21V 9/14; G02B 1/002
See application file for complete search history.

(56) References Cited

U.S. PATENT DOCUMENTS

| | | | | |
|---|---|---|---|---|
| 2018/0348548 | A1* | 12/2018 | Visser | G02B 1/002 |
| 2020/0041886 | A1* | 2/2020 | You | G02B 27/42 |
| 2021/0267139 | A1* | 9/2021 | Kuniyasu | G02B 5/3016 |

FOREIGN PATENT DOCUMENTS

| | | | | |
|---|---|---|---|---|
| WO | WO-2018067246 A2 * | 4/2018 | | G02B 1/002 |
| WO | WO-2019075215 A1 * | 4/2019 | | |

* cited by examiner

*Primary Examiner* — Abdulmajeed Aziz
*Assistant Examiner* — Nathaniel J Lee
(74) *Attorney, Agent, or Firm* — Osha Bergman Watanabe & Burton LLP

(57) ABSTRACT

A light-emitting apparatus for facilitating the growth of one or more plants. The apparatus has a light-emitting layer comprising one or more light-emitting diodes for emitting light, and at least one optical-transformation layer having one or more optical-transformation units. Each optical-transformation unit has a metasurface for adjusting one or more parameters of the light emitted from the light-emitting layer. In some embodiments, the light-emitting apparatus may further have a polarization-control layer sandwiched between the light-emitting layer and the optical-transformation layer.

14 Claims, 21 Drawing Sheets

Related U.S. Application Data

(60) Provisional application No. 62/961,317, filed on Jan. 15, 2020, provisional application No. 62/862,853, filed on Jun. 18, 2019.

(51) Int. Cl.
| | |
|---|---|
| *F21V 7/06* | (2006.01) |
| *F21V 9/14* | (2006.01) |
| *G02B 1/00* | (2006.01) |
| *H04N 13/337* | (2018.01) |
| *F21Y 105/16* | (2016.01) |
| *F21Y 115/10* | (2016.01) |

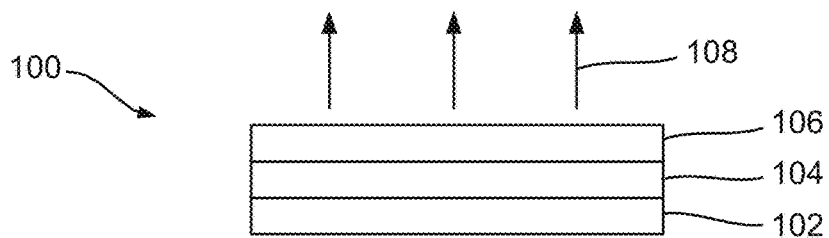
FIG. 3
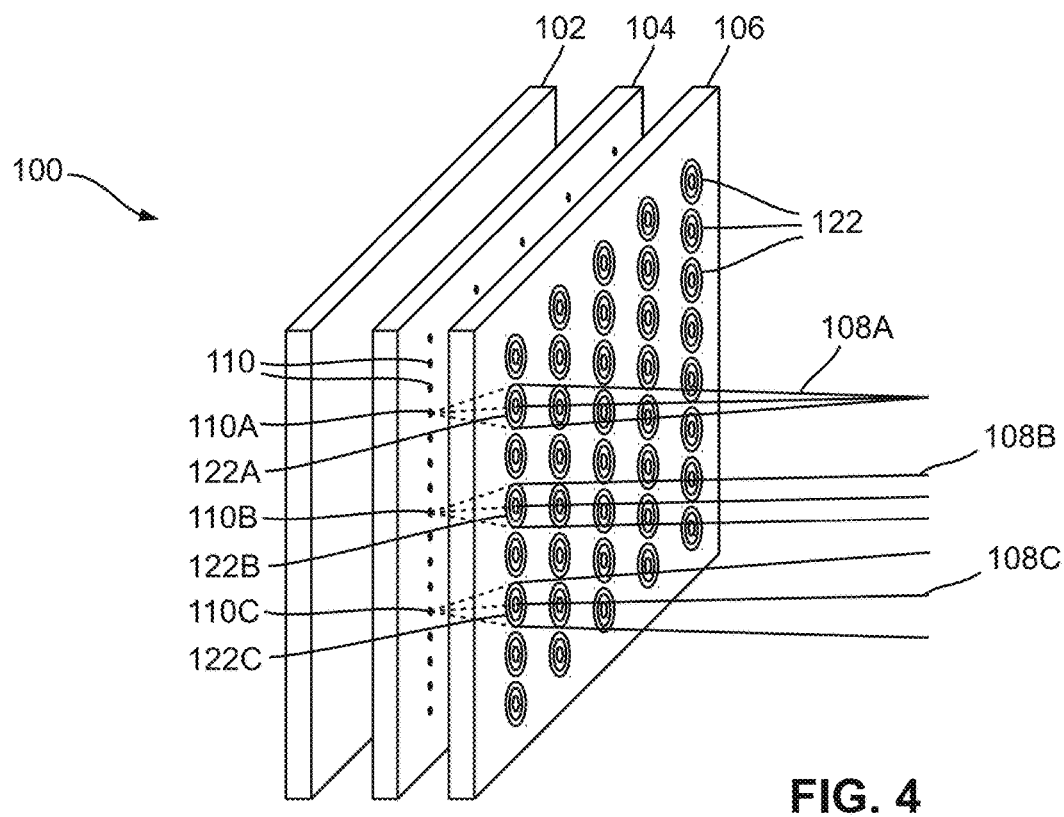
FIG. 4
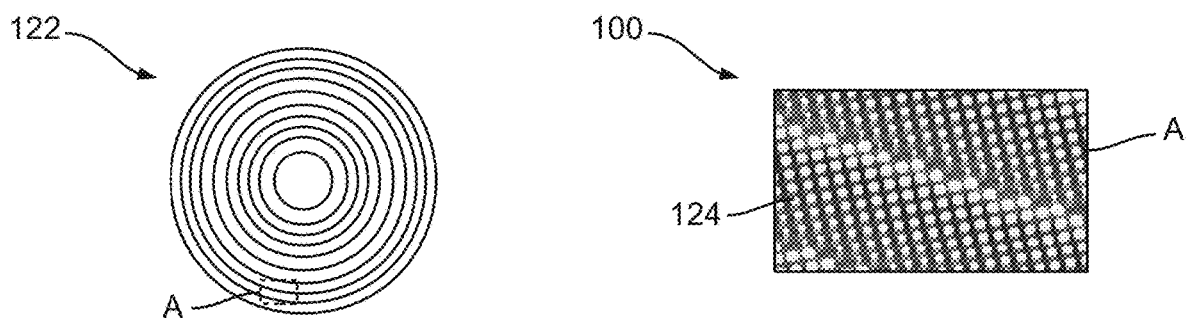
FIG. 5
FIG. 6

LIGHT-EMITTING APPARATUS USING METASURFACES AND LIGHT-EMITTING METHOD THEREOF

CROSS-REFERENCE TO RELATED APPLICATIONS

This application is a continuation of U.S. patent application Ser. No. 17/620,659 with a 371(c) date of Dec. 17, 2021, which is a national phase application of PCT Patent Application Serial No. PCT/CA2020/050849, filed on Jun. 18, 2020, which claims the benefit of U.S. Provisional Patent Application Serial Nos. 62/862,853, filed Jun. 18, 2019, and 62/961,317, filed Jan. 15, 2020, the content of each of which is incorporated herein by reference in its entirety.

FIELD OF THE DISCLOSURE

The present disclosure relates to light-emitting methods, apparatuses, and systems, and in particular to light-emitting methods, apparatuses, and systems using metasurfaces for controlling the emitted lights.

BACKGROUND

Light-Emitting Diodes (LEDs) are known and have been widely used in many industries, mostly as low-power light indicators. In recent years, LEDs with increased power output or increased luminous intensity have been developed and used as the light source for illumination. For example, with improved energy efficiency, safety, and reliability, LED lights are replacing other types of lights in the market such as incandescent lights, Compact Fluorescent Lamps (CFLs), and the like. As everyday lighting significantly contributes to the burden on power grids and greatly increases the overall requirements for electricity generation, the energy efficiency of LEDs will play a crucial role in future energy savings. It is likely that LEDs will dominate the lighting markets because of their superior energy efficiency.

High-efficient LEDs have been replacing the conventional lighting solutions in a variety of applications such as flashlights, portable lights, lamps, streetlights, and the like. LEDs may be powered by various types of power sources such as batteries, conventional power grids, renewable energy systems and energy storage systems e.g. systems using photovoltaic (PV) panels and battery banks, and the like, thereby providing great flexibility in adapting lighting solutions to specific use scenarios.

In many lighting solutions, it may be preferable to configure the light source such as a LED light source to emit directional light, e.g., to form a convergent beam and focus onto a predefined area for obtaining an enhanced illumination intensity, to form a collimated beam for reaching a target at distance, to form a divergent beam for illuminating a large area, and/or the like. In some lighting solutions, the light direction of the light source may be preferably adjustable. In prior art, light sources usually use mirrors or reflective surfaces for forming directional light, and mechanical means are often used for turning the mirrors or reflective surfaces to adjust the light direction. Such directional-lighting means are usually of relatively large size, slow responsive, and less efficient.

LEDs with increased power output and/or increased luminous intensity have also been used as light sources for growing plants and the like. Such LEDs, which are sometimes called LED grow lights, provide various advantages such as producing precise wavelengths of lights, high intensity, high efficiency, and the like. LED grow lights are also advantageous for indoor plant growing as the process of growing plants can be performed in controlled environments with much less risks and other unwanted outdoor variables.

The plant growth occurs as a result of "photosynthesis" processes. As known in the art, the photosynthesis processes convert carbon dioxide ($CO_2$) into organic materials using energy from the light. Specifically, the optical energy is absorbed through special proteins containing chlorophyll pigments that exist in photosynthetic cell membranes called chloroplasts. The photosynthetic cells are mainly in plant leaves.

However, chlorophyll only absorbs energy from particular parts or colors of the light spectrum. The effective spectra are across the blue and red color spectra. The green part of the light spectrum is reflected, which is why plant leaves are usually in green color. When photosynthetic cells in leaves die and the chlorophyll is degraded, other pigmented molecules in the leaves dominate light reflection while they are degraded to the point where the leaves only exhibit brown colors.

Thus, it is known that different pigments in chloroplasts absorb specific wavelengths of light to contribute to photosynthesis, and the photosynthetic efficiency or rate has strong correlation with the spectrum of illumination.

For example, rice plants grown under blue and red illumination have higher photosynthesis efficiency than those grown under only red illumination. Pea leaves grown under red LED light contain higher levels of (3-carotene than those grown under blue or white LED light.

Light intensity is another influential factor in photosynthesis due to the response of photosynthesis organisms to high-light intensity to reduce stress effects. Under red LED light, wheat seedlings accumulate chlorophyll at 100 mol⁻ $2s^{-1}$, but not at 500 mol $m^{-2}s^{-1}$.

It is observed that plants usually absorb the blue light spectra during their early growth, and then increasingly absorb the red light spectra as they mature and during their blooming phase. It is also observed that some plants have highly ordered constituents that make their interactions with light polarization sensitive. For example, such plants may more efficiently absorb or reflect light with a specific polarization state than light with other polarization states.

In addition, plants are capable of sensing duration of lighting period and time, and change their growth rates accordingly.

Plant cultivation using constant or universally defined illumination configuration is neither energy efficient nor optimal for photosynthesis. As prior-art LED grow lights usually provide light for the plants without consideration for the aforementioned factors, they fail to provide optimized lighting configurations for optimizing the physiological processes of growing plants. Moreover, different plants require different light characteristics (for example, intensity, spectrum, polarization, time, and the like) to achieve the best growth performance. However, prior-art LED grow lights fail to adapt to the plant needs and fail to provide appropriate light characteristics.

For example, conventional illumination systems such as LED panels used for indoor plant growth usually do not produce a uniform distribution of light over the plants. They often have intensities strongest at the center and increasingly diminishing away from the center.

FIG. 1A shows a conventional light source 10 emitting a light beam 12 towards a square image plane 14 at a distance thereto. FIG. 1B shows the light-intensity distribution 16 on the image plane 14. As can be seen, the conventional light source 10 does not produce a uniform distribution of light on the image plane 14. Rather, the light-intensity distribution 16 on the image plane 14 is strongest at the center thereof and gradually diminishing away from the center. Moreover, the intensity light distribution 16 is symmetric about the incidence point of the light beam 12 on image plane 14.

FIGS. 2A and 2B show the illumination pattern that an LED panel 10 produces in a 6×6 square-meters (m²) image plane 14 about 3 meters (m) away from the panel 10, obtained using ray-tracing. The intensity distribution is clearly non-uniform.

Therefore, a grow light using such a light source 10 that provides sufficient light in the plant periphery would cause over-illumination at the center of the plant thereby leading to poor plant growth. On the other hand, providing sufficient lighting in the plant center would cause inefficient lighting at the plant periphery, also leading to poor plant growth. Such an intensity distribution is due to symmetry of the image plane center with respect to the light emitters.

Such a light source 10 may not be desirable in other applications. For example, a street light using such a light source 10 may cause glares and overall inefficient illumination.

LEDs are also used for indoor and outdoor displays which also require deliberate control of various light characteristics such as intensity, polarization, time, and/or the like with fast response.

Therefore, it is always a desire for a LED apparatus, system, and method with controlled light characteristics.

SUMMARY

According to one aspect of this disclosure, there is provided a light-emitting apparatus. The light-emitting apparatus comprises: a light-emitting layer for emitting light; and an optical-transformation layer coupled to the light-emitting layer, the optical-transformation layer comprising one or more optical-transformation units, each optical-transformation unit comprising a metasurface for adjusting one or more parameters of the light emitted from the light-emitting layer.

In some embodiments, the light-emitting layer comprises one or more Light-Emitting Diodes (LEDs) for emitting light.

In some embodiments, the optical-transformation layer is printed onto the light-emitting layer.

In some embodiments, the light-emitting layer comprises one or more light-emitting units; the optical-transformation layer comprises a housing having one or more receptacles for receiving the one or more metasurfaces; and the one or more receptacles are at locations corresponding to those of the one or more light-emitting units for aligning the one or more metasurfaces with the one or more light-emitting units.

In some embodiments, each of the one or more receptacles comprises an outwardly expanding inner surface having an inner opening for receiving light emitted from the light-emitting layer and an outer opening for passing through the received light, the outer opening having an area greater than that of the inner opening.

In some embodiments, the inner surface of each of the one or more receptacles is reflective.

In some embodiments, the cross-section of the inner surface of each of the one or more receptacles has a paraboloid shape.

According to one aspect of this disclosure, there is provided a light-emitting apparatus. The light-emitting apparatus comprises: a light-emitting layer for emitting light; and an optical-transformation layer comprising one or more optical-transformation units, each optical-transformation unit comprising a metasurface, at least one metasurface being polarization-selective for selectively passing therethrough the light emitted from the light-emitting layer with a predefined polarization state.

In some embodiments, each of the one or more metasurfaces comprises a plurality of nano-scale structures arranged in an asymmetric base geometry.

In some embodiments, the light-emitting apparatus further comprises a polarization-control layer sandwiched between the light-emitting layer and the optical-transformation layer for polarizing the light emitted from the light-emitting layer.

In some embodiments, the light-emitting apparatus is a grow light for facilitating the growth of one or more plants.

According to one aspect of this disclosure, there is provided a light-emitting apparatus for facilitating the growth of one or more plants. The light-emitting apparatus comprises: a light-emitting layer for emitting light; and at least one optical-transformation layer comprising one or more optical-transformation units, each optical-transformation unit comprising a metasurface for adjusting one or more parameters of the light emitted from the light-emitting layer for optimizing illumination configurations of the one or more plants.

According to one aspect of this disclosure, there is provided a display apparatus. The display apparatus comprises: a light-emitting layer for emitting light; and at least one optical-transformation layer comprising one or more optical-transformation units, each optical-transformation unit comprising a metasurface for adjusting one or more parameters of the light emitted from the light-emitting layer for displaying one or more images.

According to one aspect of this disclosure, there is provided a light-emitting apparatus. The light-emitting apparatus comprises: a light-emitting layer for emitting light; a polarization-control layer coupled to the light-emitting layer for polarizing the light emitted from the light-emitting layer; and at least one optical-transformation layer coupled to the polarization-control layer, the at least one optical-transformation layer comprising one or more optical-transformation units, each optical-transformation unit comprising at least one metasurface, at least one metasurface being polarization-selective for selectively passing therethrough the polarized light from the polarization-control layer for switching between different illumination patterns or images.

According to one aspect of this disclosure, there is provided a light-emitting apparatus. The light-emitting apparatus comprises: a light-emitting layer for emitting light; a polarization-control layer coupled to the light-emitting layer for polarizing the light emitted from the light-emitting layer; and at least one optical-transformation layer coupled to the polarization-control layer, the at least one optical-transformation layer comprising one or more optical-transformation units, each optical-transformation unit comprising at least one metasurface, at least one metasurface being polarization-selective for selectively passing therethrough the polarized light from the polarization-control layer for creating multiple different illumination patterns or images at different locations.

According to one aspect of this disclosure, there is provided a light-emitting apparatus. The light-emitting apparatus comprises: a light-emitting layer for emitting light towards a source field of view (FOV); and at least one metasurface layer in front of the light-emitting layer for directing the light emitted from the light-emitting layer towards a first FOV having an angular span smaller than that of the source FOV.

In some embodiments, the light-emitting apparatus further comprises a polarization-control layer sandwiched between the light-emitting layer and the at least one optical-transformation layer; the polarization-control layer is configured for, in response to a control signal, polarizing the light emitted from the light-emitting layer to a first polarization state or to a second polarization state; and wherein the at least one optical-transformation layer is configured for directing the light from the polarization-control layer in the first polarization state towards a first FOV having an angular span smaller than that of the source FOV, and directing the light from the polarization-control layer in the second polarization state towards a second FOV having an angular span greater than that of the first FOV.

According to one aspect of this disclosure, there is provided a light-emitting apparatus. The light-emitting apparatus comprises: a light-emitting layer for emitting light; and an optical-transformation layer in front of the light-emitting layer, the optical-transformation layer comprising a plurality of optical-transformation units, each optical-transformation unit comprising a metasurface for directing light emitted from the light-emitting layer towards a target area for forming a predefined light-distribution pattern.

In some embodiments, the predefined light-distribution pattern is a substantively uniform optical-energy distribution on the target area.

In some embodiments, the plurality of metasurfaces comprise a first set of metasurfaces for directing the light emitted from the light-emitting layer towards borders of the target area, and a second set of metasurfaces for directing the light emitted from the light-emitting layer towards a center of the target area, for generating the substantively uniform optical-energy distribution on the target area.

According to one aspect of this disclosure, there is provided a solar-energy harvesting apparatus. The solar-energy harvesting apparatus comprises: a photovoltaic layer having a plurality of photovoltaic cells; and at least one metasurface layer in front of the photovoltaic layer for directing light to the photovoltaic layer substantively without causing reflection on the photovoltaic layer.

In some embodiments, the solar-energy harvesting apparatus comprises a plurality of metasurface layers for directing light at an incident angle within a predefined range to perpendicularly imping the photovoltaic layer.

According to one aspect of this disclosure, there is provided a light-emitting apparatus. The light-emitting apparatus comprises: a light-emitting layer for emitting light; and at least one metasurface layer in front of the light-emitting layer for directing the light emitted from the light-emitting layer in a first polarization state towards a first FOV and directing the light emitted from the light-emitting layer in a second polarization state towards a second FOV; the first and second FOVs are overlapped and laterally offset from each other for forming a three-dimensional (3D) perception to a user wearing a pair of glasses with lenses of different polarization states.

According to one aspect of this disclosure, there is provided a light-emitting apparatus. The light-emitting apparatus comprises: a light-emitting layer for emitting light; and at least one metasurface layer in front of the light-emitting layer for directing the light emitted from the light-emitting layer in a first polarization state towards a first FOV and directing the light emitted from the light-emitting layer in a second polarization state towards a second FOV; the first and second FOVs are laterally offset from each other such that the first FOV is only viewable to a first eye of a user at a predefined distance and the second FOV is only viewable to a second eye of the user at the predefined distance, for forming a 3D perception to the user.

BRIEF DESCRIPTION OF THE DRAWINGS

FIG. 3 is a schematic diagram showing the structure of a lighting-emitting apparatus, according to some embodiments of this disclosure, the lighting-emitting apparatus comprising a LED light-emitting layer and an optical-transformation layer having one or more metasurfaces;

FIG. 4 is a schematic exploded view of the lighting-emitting apparatus shown in FIG. 3;

FIG. 5 shows an optical-transformation unit of an optical-transformation layer of the lighting-emitting apparatus shown in FIG. 3;

FIG. 6 shows an example of the structure of a metasurface for forming the optical-transformation unit shown in FIG. 5;

DETAILED DESCRIPTION

Figure 1A:
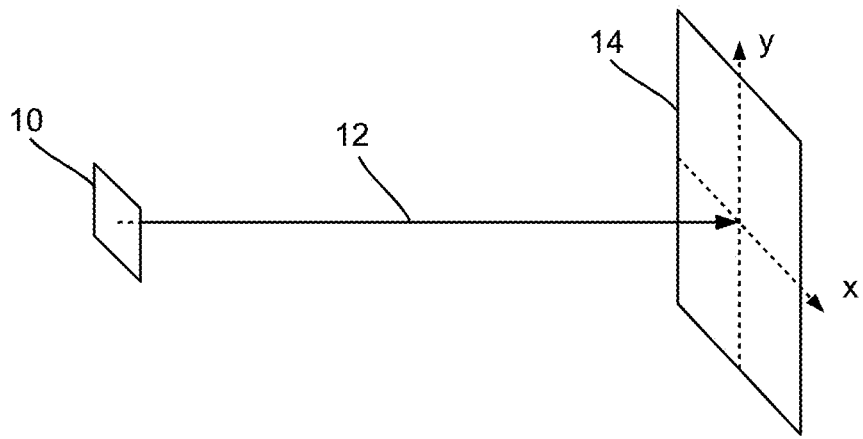
FIG. 1A is a schematic diagram showing a prior-art light source emitting a light beam towards a square image plane at a distance thereto.
Figure 1B:
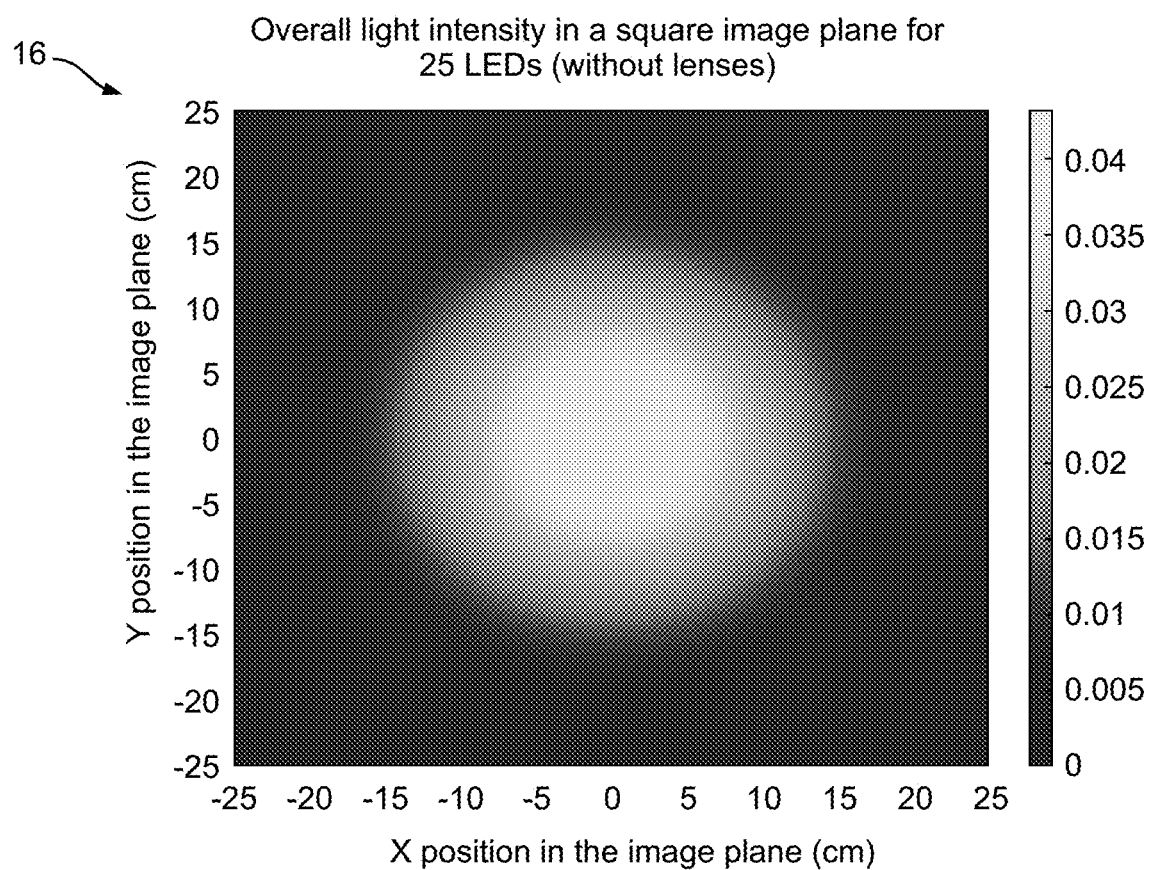
FIG. 1B shows the light-intensity distribution on the image plane of the light emitted from the prior-art light source shown in FIG. 1A.

Light-Emitting Apparatus Having a Light-Emitting Layer and an Optical-Transformation Layer Turning now to FIGS. 3 and 4, a light-emitting apparatus (also denoted "lighting apparatus" or "light apparatus") is shown and is generally identified using reference numeral 100, according to some embodiments of this disclosure. Herein, the light-emitting apparatus may be an apparatus for illumination, an apparatus for facilitating the growth of plants, or an apparatus for display an image or a video thereon.

The light-emitting apparatus 100 in these embodiments comprises a light-emitting layer 104 sandwiched between a substrate 102 and an optical-transformation layer 106 for emitting light 108 from the light-emitting layer 104 through the optical-transformation layer 106. When the emitted light 108 goes through the optical-transformation layer 106, the optical-transformation layer 106 adjusts one or more parameters of the light 108 such as the amplitude or intensity, phase, polarization, pattern, direction, and the like.

The light-emitting layer 104 may be any suitable lighting devices. In these embodiments, the light-emitting layer 104 is printed, coated, or otherwise coupled to the substrate 102 and comprises a plurality of light-emitting diodes (LEDs) 110 arranged in a matrix form although other arrangements of the LEDs 110 are also readily available. Herein, the LEDs 110 may be any suitable LEDs such as conventional LEDs, quantum dot (QD) LEDs, organic LEDs (OLEDs), and/or the like.

The optical-transformation layer 106 is printed, coated, or otherwise coupled to the light-emitting layer 104 for adjusting or otherwise transforming the parameters of the light emitted from the light-emitting layer 104 (described in more detail later).

The optical-transformation layer 106 comprises one or more optical-transformation units 122 arranged in a predefined pattern with each optical-transformation unit 122 comprising a metasurface. Herein, a metasurface is a two-dimensional array of nano-structures with a subwavelength spacing and may be used for modulating electromagnetic waves. The detail of metasurface is described in the academic paper entitled "LIGHT PROPAGATION WITH PHASE DISCONTINUITIES: GENERALIZED LAWS OF REFLECTION AND REFRACTION," by Nanfang Yu, Patrice Genevet, Mikhail A. Kats, Francesco Aieta, Jean-Philippe Tetienne, Federico Capasso, and Zeno Gaburro, Science volume 334, issue 6054, pages 333-337 (2011).

As shown in FIGS. 5 and 6, each metasurface unit 122 comprises a metasurface having a subwavelength thickness (i.e., the thickness thereof being smaller than the wavelength of the light emitted from the light-emitting layer 104) and comprising a plurality of nano-scale structures 124 arranged in a periodical manner with a specific order for precisely adjusting or transforming characteristics or parameters (e.g., amplitude or intensity, phase, polarization, pattern, direction, and the like) of incident light, thereby allowing precise control of the properties of the light output therefrom.

In some embodiments, the nano-scale structures 124 (also denoted "nano-structures") may be subwavelength structures made of suitable metal or dielectric materials with one or more dimensions thereof being smaller than the wavelength of the light emitted from the light-emitting layer 104. In some embodiments, the nano-scale structures 124 may comprise a plurality of nanorods (also denoted "antennas"; see FIG. 6). In some embodiments, the nano-scale structures 124 may comprise a plurality of V-shaped nanorods. As described above, the nano-scale structures 124 form a periodic or repetitive pattern and each pattern may comprise a plurality of nano-scale structures 124 of different shapes and dimensions.

Depending on the geometry and distributions of the nano-structures 124, the optical-transformation layer 106 may be configured for adjusting or transforming one or more parameters of the incident light.

For example, as shown in FIG. 4, a metasurface unit 122A of the optical-transformation layer 106 may be configured for phase transformation of an incident light 108A and modifying the direction thereof to be convergent thereby forming a convergent light beam focusing at a desired point spaced from the optical-transformation layer 106.

As another example, a metasurface unit 122B of the optical-transformation layer 106 may be configured for phase transformation of an incident light 108B and modifying the direction thereof to be collimated thereby forming a collimated light beam for reaching a target at distance.

As a further example, a metasurface unit 122C of the optical-transformation layer 106 may be configured for phase transformation of an incident light 108C and modifying the direction thereof to be divergent thereby forming a divergent light beam for illuminating a large area.

In conventional grow-light applications, one or more lighting devices (also called grow-light devices) are used for emitting light towards the plants for facilitating the growth thereof. In these applications, a portion of the light emitted from the grow-light devices such as light emitted from the peripheral area of the grow-light devices may only partly impinge the plants due to the divergent nature of the light beams thereby wasting the optical energy. Such an issue may be more significant if the plants are spaced from each other.

In some embodiments, the light-emitting apparatus 100 may be used as a grow-light device without or at least alleviating the above-mentioned issue. In these embodiments, the optical-transformation layer 106 or at least some metasurface units 122 thereof may be designed to modify the direction of the incident light 108 towards the plants. For example, the optical-transformation layer 106 may be designed to adjust the light emitted from the peripheral area of the light-emitting layer 104 towards the plants while making the light emitted from the central area of the light-emitting layer 104 more divergent to cover more areas of the plants, thereby giving rise to significantly more efficient illumination.

In some embodiments, the optical-transformation layer 106 or at least some metasurface units 122 thereof may be designed to adjust the parameters of the light emitted from the light-emitting layer 104 for optimizing the illumination configurations of the plants and adapting to the grow-needs thereof.

In some embodiments, the optical-transformation layer 106 or at least some metasurface units 122 thereof may be designed to adjust the light emitted from the light-emitting layer 104 towards desired directions to form areas with high or low light-concentrations thereby creating hot or cool spots at target illumination areas. Such hot or cool spots may be created for treating damaged areas of the plants or for illuminating fragile parts thereof.

Figure 7:
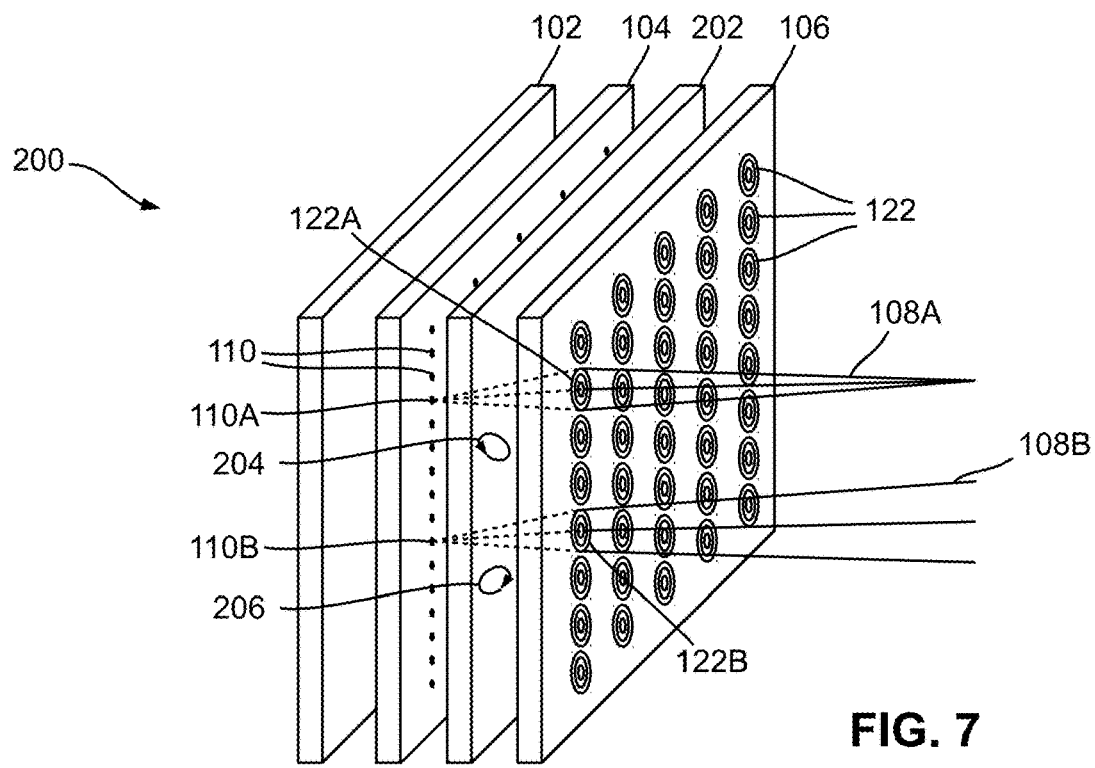
FIG. 7 is a schematic exploded view of a lighting-emitting apparatus, according to some embodiments of this disclosure, the lighting-emitting apparatus comprising a LED light-emitting layer, a polarization-control layer, and a metasurface optical-transformation layer.

FIG. 7 is a schematic exploded view of a light-emitting apparatus 200 according to some embodiments of this disclosure. In these embodiments, the light-emitting apparatus 200 is similar to the light-emitting apparatus 100 in the embodiments shown in FIGS. 3 and 4 except that the light-emitting apparatus 200 further comprises a polarization-control layer 202 sandwiched between the light-emitting layer 104 and the optical-transformation layer 106.

Moreover, in these embodiments, the optical-transformation layer 106 may be polarization-selective. In particular, each metasurface unit 122 may be selective of a specific polarization, i.e., only allow light with a specific polarization state to pass therethrough and block light with other polarization states. Different metasurface units 122 of the optical-transformation layer 106 may have same or different polarization-selectivity settings, depending on the implementation.

The polarization-control layer 202 is made of a suitable material that polarizes incident light when the incident light travels therethrough (represented by the circular arrows 204 and 206 in FIG. 7). In some embodiments, the polarization-control layer 202 may form a single polarization-control unit and polarize the incident light to a predefined polarization state.

In some other embodiments, the polarization-control layer 202 may form a single polarization-control unit and comprise liquid crystals with voltage-controlled retardations. Therefore, the polarization of the polarization-control layer 202 may be controlled by adjusting the voltage applied thereto.

In yet some other embodiments, the polarization-control layer 202 may comprise a plurality of polarization-control units (not shown) corresponding to the plurality of metasurface units 122 of the optical-transformation layer 106. At least some polarization-control units may be made of liquid crystals and the polarization thereof are controllable by adjusting the voltage applied thereto.

The optical-transformation layer 106 thus exhibits a selective response to light of distinct polarization states. In some embodiments, the light-emitting apparatus 200 may be used as a display which may quickly switch between displaying different images without the need of adjusting the light source (e.g., the light-emitting layer 102). The switching-display or illumination patterns may be encoded into a polarization pattern of the optical-transformation layer 106 and/or the voltage pattern thereof for automatic pattern-switching.

For example, in some embodiments, the light-emitting apparatus 200 may be used as a display and the polarization-control layer 202 and the optical-transformation layer 106 thereof may each comprise a plurality of units forming corresponding pixels 232 and 234, respectively, with each pixel comprising one or more subpixels (see FIGS. 8A to 10B).

Figure 8A:
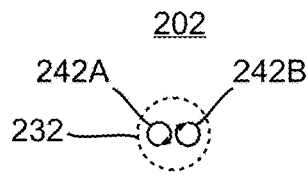
FIG. 8A is a schematic diagram showing a pixel of the polarization-control layer of the light apparatus shown in FIG. 7, according to some embodiments of this disclosure.
Figure 8B:
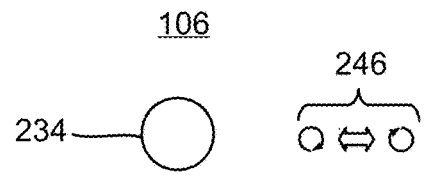
FIG. 8B is a schematic diagram showing a pixel of the optical-transformation layer of the light apparatus shown in FIG. 7, corresponding to the pixel of the polarization-control layer shown in FIG. 8A.

In one embodiment as shown in FIGS. 8A and 8B, each pixel 232 of the polarization-control layer 202 comprises a plurality of subpixels (e.g., two subpixels 242A and 242B). Thus, the polarization-control layer 202 comprises a plurality of subpixel sets (also identified using reference numeral 242A and 242B) with each set comprise a respective subpixel 242A or 242B of each pixel 232. Each subpixel set is configured to a specific polarization setting (see FIG. 8A).

As shown in FIG. 8B, each pixel 234 of the optical-transformation layer 106 has one metasurface subpixel (also denoted using reference numeral 234) which is controlled to switch between two polarization-selectivity and phase-transformation settings (indicated by the symbols 246).

During operation, the light-emitting layer 104 emits light (not shown). With suitable polarization settings, each subpixel set of the polarization-control layer 202 adjusts the light emitted from the light-emitting layer 104 and form two light beams (not shown) with different polarization states. The two light beams are overlapped and incident into the optical-transformation layer 106.

The metasurface subpixels 234 of the optical-transformation layer 106 are controlled to switch between two polarization-selectivity and phase-transformation settings 246 with the first polarization-selectivity setting suitable for allowing the light beam from the first subpixel set 242A to pass therethrough and the second polarization-selectivity setting suitable for allowing the light beam from the second subpixel set 242B to pass therethrough. Consequently, the light-emitting apparatus 200 alternately displays two images 222 and 224 (see FIGS. 11A and 11B) at two directions. Depending on the phase-transformation settings, the two directions may be two different directions as shown in FIGS. 11A and 11B, or may be the same direction.

Figure 11A:
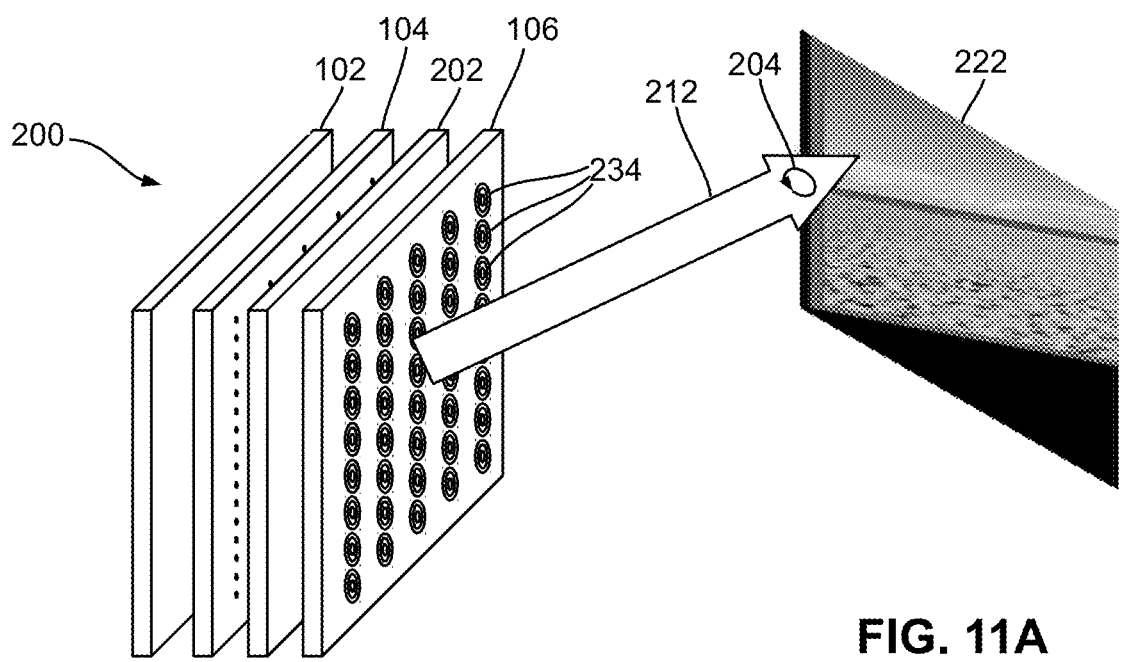
FIGS. 11A and 11B are schematic diagrams showing the light apparatus shown in FIG. 7 displaying two images at two directions, according to the embodiments shown in FIGS. 8A and 8B, or FIGS. 9A and 9B.
Figure 11B:
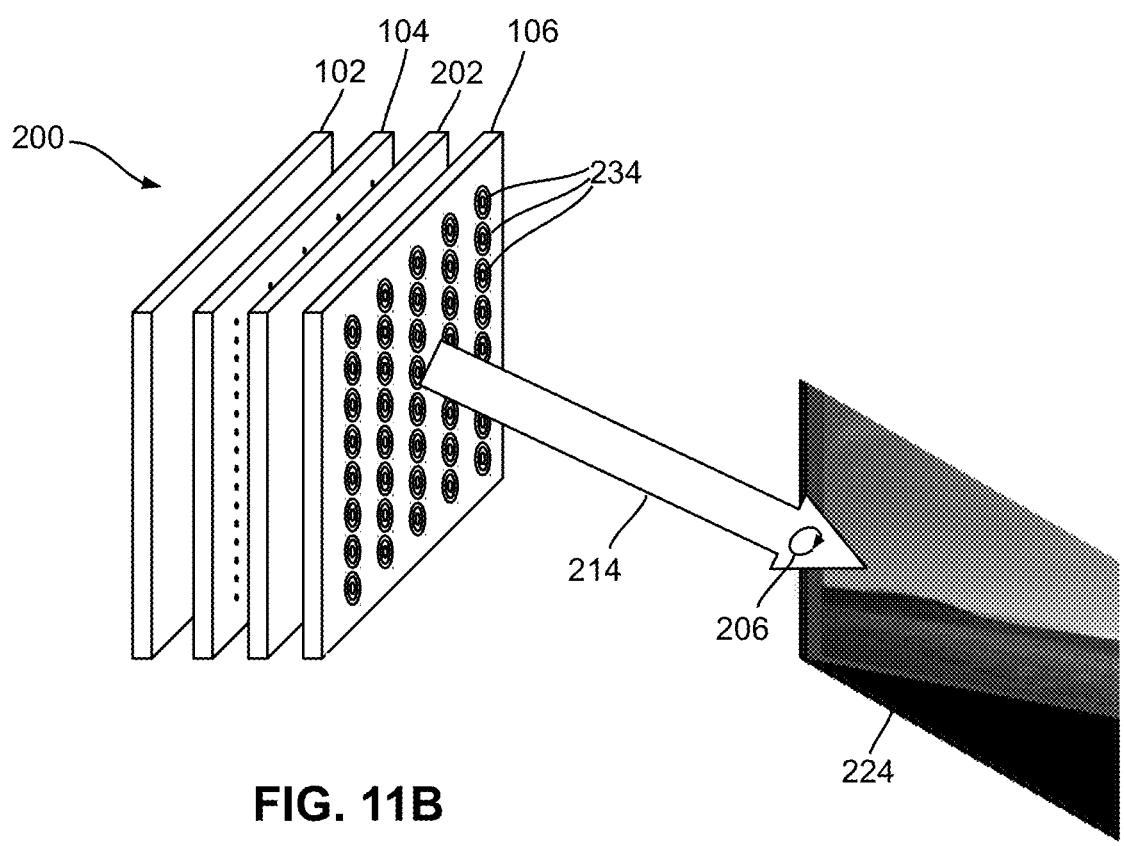
Figure 12:
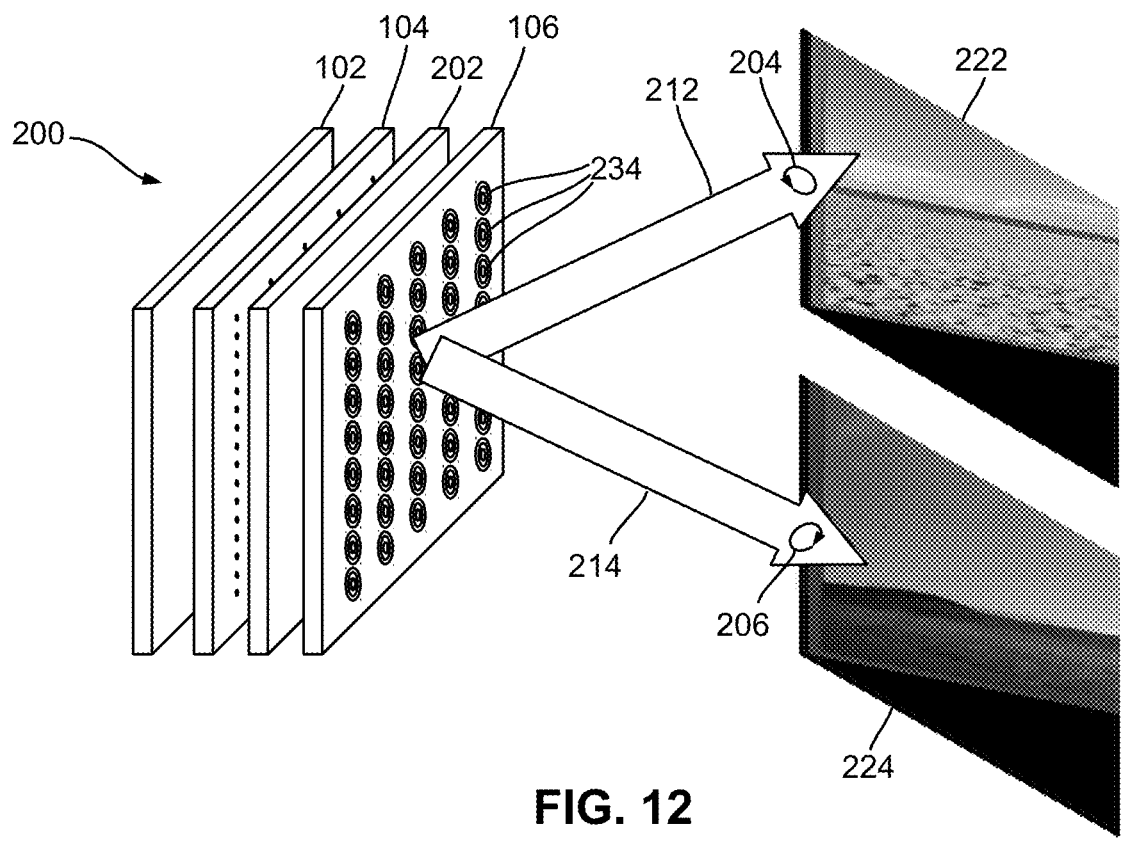
FIG. 12 is a schematic diagram showing the light apparatus shown in FIG. 7 displaying two images at two directions, according to the embodiments shown in FIGS. 8A and 8B, FIGS. 9A and 9B, or FIGS. 10A and 10B.

The switching of the polarization-selectivity and phase-transformation settings of the optical-transformation layer 106 (also denoted as the refresh rate) may be at a slow rate or frequency to alternately displays the two images 222 and 224 in a palpable manner such as displaying the first image 222 for a few second at the first location and then displaying the second image 224 at the second location for another few seconds (FIGS. 11A and 11B). Alternatively, the refresh rate of the optical-transformation layer 106 may be at a high frequency (e.g., greater than or equal to 60 frames per second) such that the two images 222 and 224 are effectively simultaneously displayed at the two locations to human eyes (see FIG. 12).

Figure 9A:
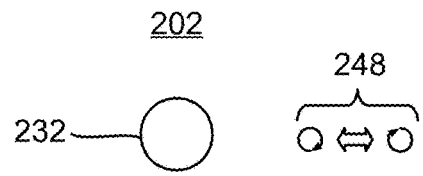
FIG. 9A is a schematic diagram showing a pixel of the polarization-control layer of the light apparatus shown in FIG. 7, according to yet some embodiments of this disclosure.
Figure 9B:
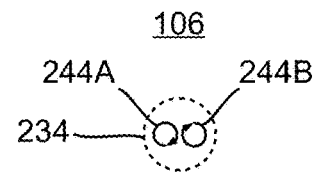
FIG. 9B is a schematic diagram showing a pixel of the optical-transformation layer of the light apparatus shown in FIG. 7, corresponding to the pixel of the polarization-control layer shown in FIG. 9A.

In one embodiment as shown in FIGS. 9A and 9B, each pixel 232 of the polarization-control layer 202 has one metasurface subpixel (also denoted using reference numeral 232) which is controlled to switch between two polarization settings (see FIG. 9A, indicated by the symbols 248).

As shown in FIG. 9B, each pixel 234 of the optical-transformation layer 106 comprises a plurality of subpixels (e.g., two subpixels 244A and 244B). Thus, the optical-transformation layer 106 comprises a plurality of subpixel sets (also identified using reference numeral 244A and 244B) with each set comprise a respective subpixel 244A or 244B of each pixel 234. Each subpixel set is configured to a specific polarization-selectivity and phase-transformation setting.

During operation, the light-emitting layer 104 emits light (not shown). The polarization-control layer 202 adjusts the light emitted from the light-emitting layer 104 and form a light beam (not shown) with switching polarization states so as to pass through the first subpixel set 244A of the optical-transformation layer 106 or pass through the second subpixel set 244B thereof. Depending on the refresh rate of the optical-transformation layer 106, the light-emitting apparatus 200 may alternately display two images 222 and 224 at two locations in a palpable manner or effectively simultaneously to human eyes (see FIGS. 11A, 11B, and 12).

Figure 10A:
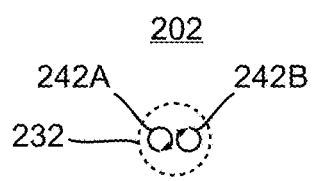
FIG. 10A is a schematic diagram showing a pixel of the polarization-control layer of the light apparatus shown in FIG. 7, according to still some embodiments of this disclosure.
Figure 10B:
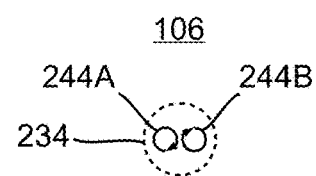
FIG. 10B is a schematic diagram showing a pixel of the optical-transformation layer of the light apparatus shown in FIG. 7, corresponding to the pixel of the polarization-control layer shown in FIG. 10A.

In one embodiment as shown in FIGS. 10A and 10B, each pixel 232 of the polarization-control layer 202 comprises a plurality of subpixels (e.g., two subpixels 242A and 242B). Thus, the polarization-control layer 202 comprises a plurality of subpixel sets (also identified using reference numeral 242A and 242B) with each set comprise a respective subpixel 242A or 242B of each pixel 232. Each subpixel set is configured to a specific polarization setting (see FIG. 10A).

Correspondingly and as shown in FIG. 10B, each pixel 234 of the optical-transformation layer 106 comprises a plurality of subpixels (e.g., two subpixels 244A and 244B). Thus, the optical-transformation layer 106 comprises a plurality of subpixel sets (also identified using reference numeral 244A and 244B) with each set comprise a respective subpixel 244A or 244B of each pixel 234. Each subpixel set is configured to a specific polarization-selectivity and phase-transformation setting. The polarization-selectivity setting of each subpixel set 244A or 244B matches the polarization setting of each subpixel set 242A or 242B (i.e., allowing the light from the corresponding subpixel 242A or 242B to pass therethrough).

During operation, the light-emitting layer 104 emits light (not shown). Each subpixel set 242A or 242B of the polarization-control layer 202 adjusts the light emitted from the light-emitting layer 104 and form two light beams (not shown) with different polarization states. The two light beams are overlapped and incident into the optical-transformation layer 106. Each light beam from the polarization-control layer 202 passes through a correspondingly subpixel set 244A or 244B of the optical-transformation layer 106, thereby simultaneously forming two images 222 and 224 at two directions (see FIG. 12).

In some embodiments, the light-emitting apparatus 200 may be used as an illumination device which may quickly switch between different illumination patterns. Moreover, the light-emitting apparatus 200 may be used as a grow-light device with customized polarization patterns adapting to the plants having highly-ordered constituents sensitive to light polarization. For example, some plants may absorb or reflect light with a specific polarization state significantly more efficient than light with other polarization states. Therefore, the light-emitting apparatus 200 may be used as a grow-light device with customized polarization patterns adapting to the plants' needs for optimizing the photosynthesis process thereof. The structure of the illumination device 200 in various embodiments may be similar to that shown in FIGS. 8A to 10B.

Figure 13:
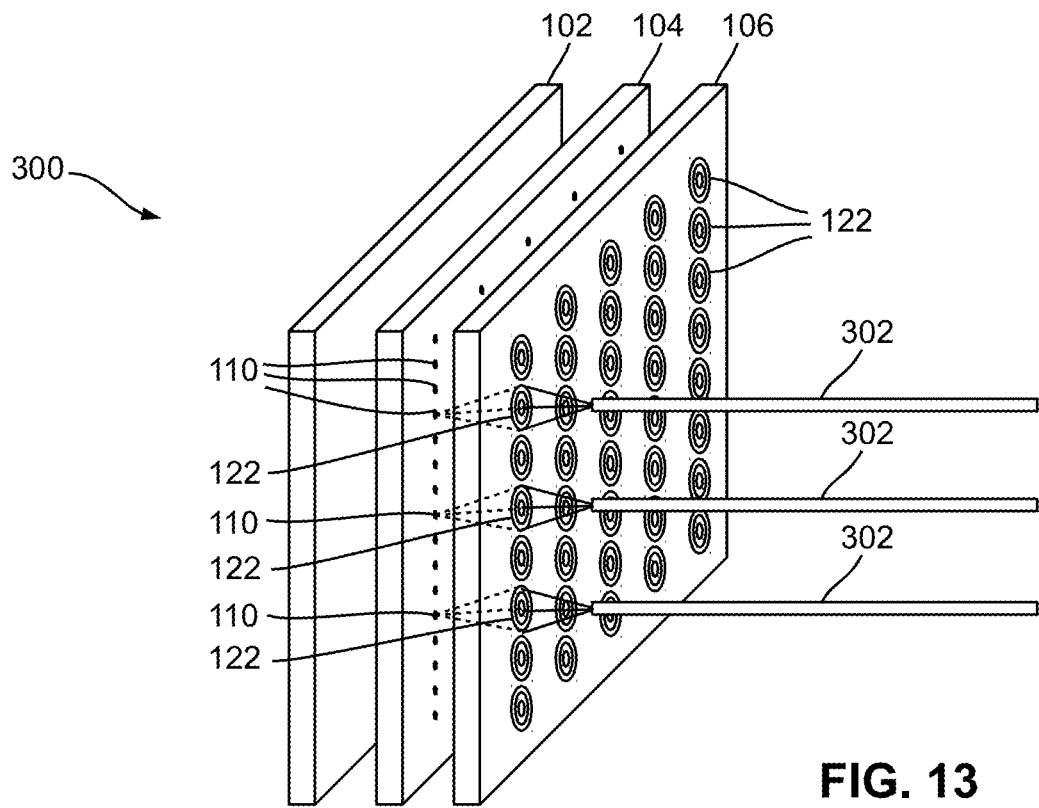
FIG. 13 is a schematic exploded view of a lighting-emitting apparatus having a plurality of fiber-optic cables, according to some embodiments of this disclosure.

By using metasurfaces in the optical-transformation layer 106, the lighting device disclosed herein may efficiently couple the optical energy into fiber-optic cables. For example, FIG. 13 is a schematic exploded view of a light-emitting apparatus 300 according to some embodiments of this disclosure. In these embodiments, the light-emitting apparatus 300 is similar to the light-emitting apparatus 100 in the embodiments shown in FIGS. 3 and 4 and further comprises a plurality of fiber-optic cables 302 adjacent respective metasurface units 122. Each metasurface unit 122 is configured to form a convergent light beam incident into the corresponding fiber-optic cable 302. Such a lighting device 300 may be used in various applications such as efficient indoor illumination, locally optimized illumination of plants, and efficient distribution of optical energy over a target area.

Although in the embodiments shown in FIG. 13, the light-emitting apparatus 300 is similar to the light-emitting apparatus 100 (i.e., having three layers 102, 104, and 106), in some embodiments, the light-emitting apparatus 300 may be similar to the light-emitting apparatus 200 (i.e., having four layers 102, 104, 202, and 106).

In above embodiments, the lighting device 100, 200, or 300 only comprises one optical-transformation layer 106. In some embodiments, the lighting device may comprise a plurality of optical-transformation layers 106. In some embodiments, at least some of the plurality of optical-transformation layers 106 may be polarization-selective, and different optical-transformation layers 106 may have same or different polarization-selectivity settings, depending on the implementation.

As described above, various layers of the light-emitting apparatus 100 such as the optical-transformation layer 106 may be printed to the substrate 102 or onto each other using any suitable printing technology.

Figure 14:
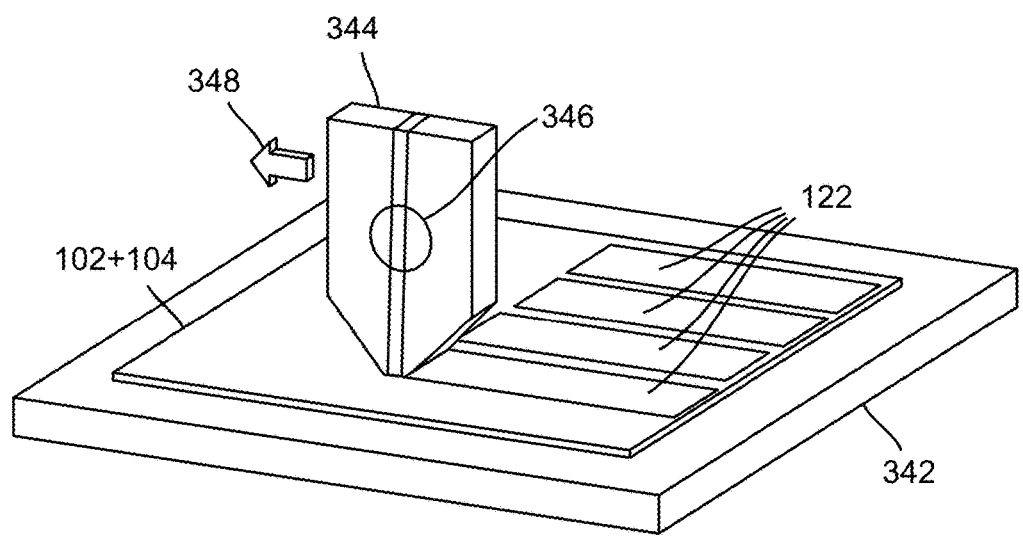
FIG. 14 is a conceptual diagram showing the printing of the optical-transformation layer of the lighting-emitting apparatus shown in FIG. 3.

For example, FIG. 14 is a conceptual diagram showing the printing of some layers such as the optical-transformation layer 106 the light-emitting layer 104 in some embodiments.

As shown, the substrate 102 (with the light-emitting layer 104 printed or otherwise coupled thereon) arranged on a flat surface of a platform 342. A printing device (not shown) with a slot-die head 344 is used for printing the sublayers/layers. The slot-die head 344 comprises an ink cartridge 346 filled with respective "ink" and moves (indicated by the arrow 348) on the substrate 102 (or in particular the printed light-emitting layer 104) to deposit the metasurface material from the ink cartridge 346 thereto to form the one or more metasurface optical-transformation units 122.

Herein, the "ink" refers to sublayer/layer material in a suitable form such as a solution, a gel, or powder that is used as a precursor for the fabrication of layers. During the slot-die fabrication of each layer, heat treatment is usually used for evaporating the solvent or for melting the powders to solidify the fabricated layer.

Figure 15:
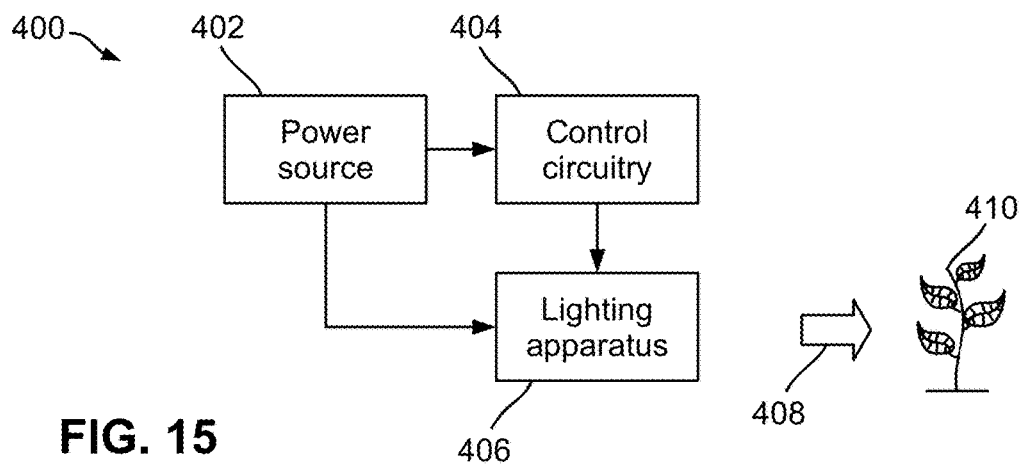
FIG. 15 is a schematic diagram of a lighting system for facilitating the growth of plants, according to some embodiments of this disclosure.

FIG. 15 is a schematic diagram of a lighting system 400 for facilitating the growth of one or more plants 410 according to some embodiments of this disclosure. As shown, the system 400 comprises a power source 402 powering a control circuitry 404 and a light-emitting apparatus 406 which may be any of the above-described light-emitting apparatus 100, 200, or 300. The control circuitry 404 controls the light-emitting apparatus 406 for emitting light 408 with customized parameters for illuminating the plants 410 to facilitate the growth thereof.

Figure 16:
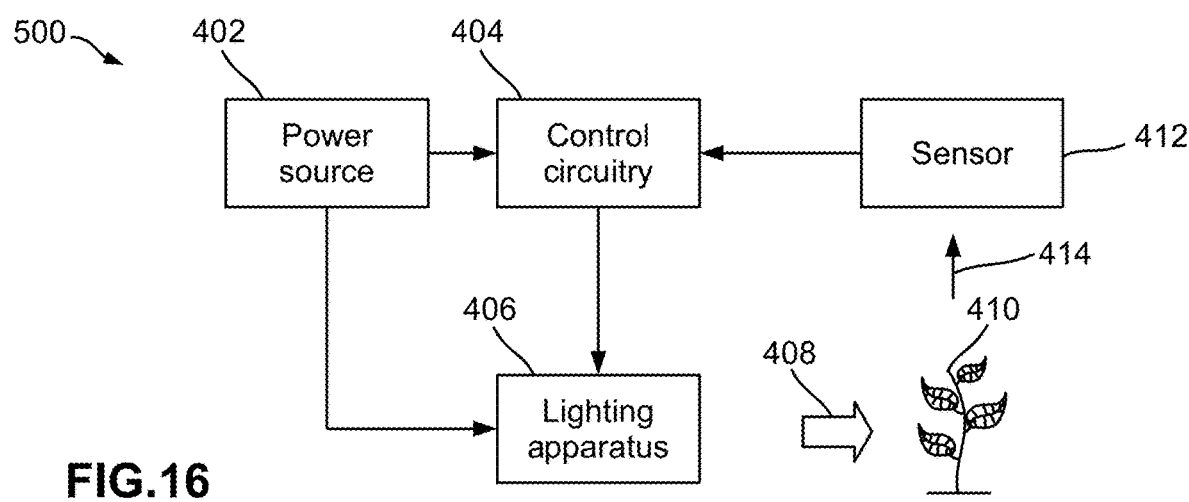
FIG. 16 is a schematic diagram of a lighting system for facilitating the growth of plants, according to some embodiments of this disclosure, the lighting system comprising a sensor for monitoring the growth of the plants.

FIG. 16 is a schematic diagram of a lighting system 500 for facilitating the growth of plants according to some embodiments of this disclosure. The lighting system 500 in these embodiments is similar to the lighting system 400 shown in FIG. 14 and further comprises a sensor 412 for monitoring the growth of the plants 410, such as a light sensor for monitoring the light 414 reflected from the plants 410, and provides feedback to the control circuitry 404 for adjusting the light parameters as described above to optimize the illumination configuration to better facilitate the growth of the plants 410.

In some embodiments, the light-emitting layer 104 may be transparent LED layer and the light-emitting apparatus 100, 200, or 300 may further comprise a solar-cells layer "behind" the light-emitting layer 104 (i.e., between the substrate 102 and the light-emitting layer 104) having one or more photovoltaic cells (also denoted "solar cells") for converting light energy to electrical energy, and an electronic-power converter layer behind the solar-cells layer. The detail of the solar-cells layer and the electronic-power converter layer is described in Applicant's copending U.S. provisional patent application Ser. No. 62/831,828, entitled "HYBRID-ENERGY APPARATUS, SYSTEM, AND METHOD THEREFOR", the content of which is incorporated herein by reference in its entirety.

Figure 17:
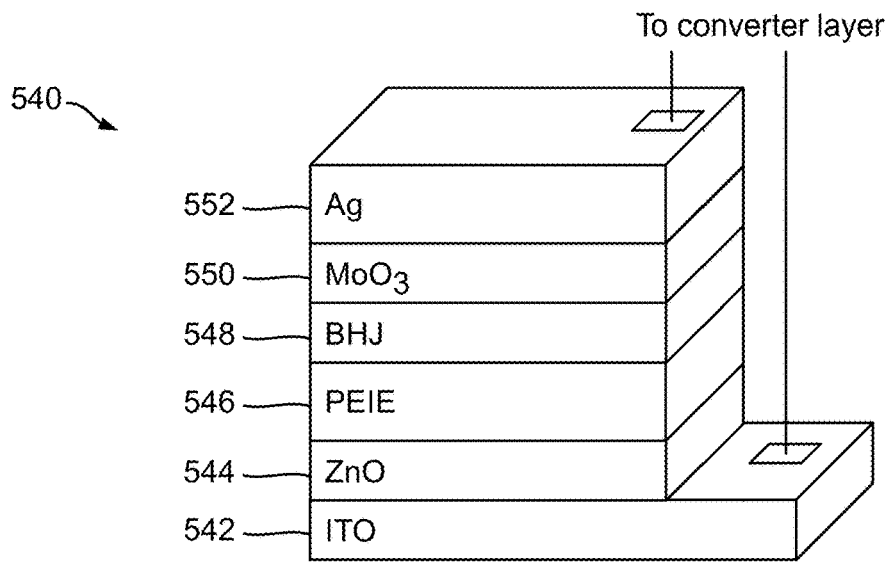
FIG. 17 is a schematic diagram showing the structure of a solar-cells layer incorporated in the lighting-emitting apparatus shown in FIG. 3.

For example, FIG. 17 shows an example of the solar-cells layer 540 comprising a plurality of sublayers. As shown, the solar-cells layer 500 in this example comprises an anode sublayer 542 made of suitable material such as Indium Tin Oxide (ITO), a sublayer of Zinc Oxide (ZnO) 544, a sublayer of poly(ethylenimine) and poly(ethylenimine) ethoxylated (i.e., PEIE) 546, a sublayer of organic solar-cells 548 such as a sublayer of polymer solar-cells such as a sublayer of bulk heterojunctions (BHJs), a sublayer of Molybdenum trioxide (MoO3) 550, and a cathode sublayer 552 made of suitable material such as silver (Ag) or Aluminum (Al). The anode 542 and the cathode 552 are electrically connected to other layers such as the electronic-power converter layer.

Lighting System with Controlled Illumination Patterns

Figure 18:
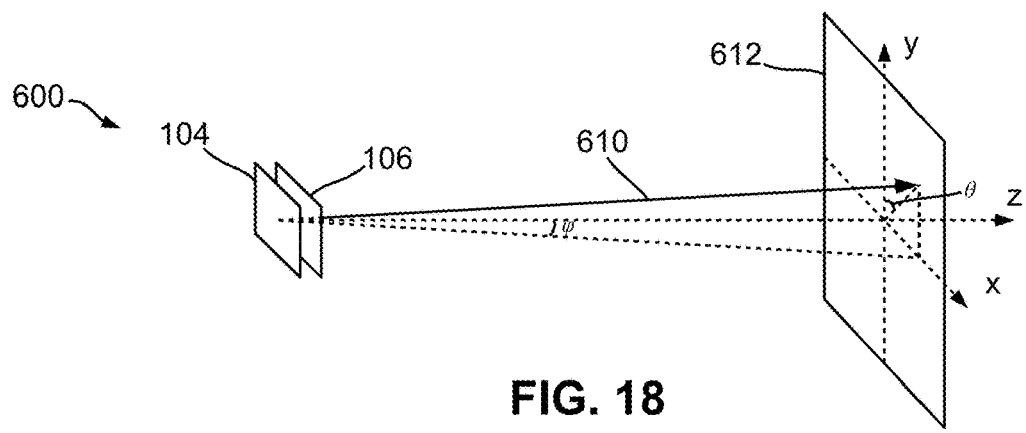
FIG. 18 is a schematic diagram showing the structure of a lighting system for use as an illumination or light source with controlled illumination patterns, according to some embodiments of this disclosure.

FIG. 18 shows a light-emitting apparatus 600 in some embodiments for use as an illumination or light source with controlled illumination patterns by precise control of light deflection angles using metasurfaces or other light control structures. The illumination from the lighting system 600 is distributed according a specific pattern onto the image plane 612 where one or more objects such as one or more plants are located therein.

For ease of annotation, the axes x and y denote the orthogonal axes defining the image plane 612, the z-axis is an axis along the controllable lighting structure 100 and the image plane 612 and is orthogonal to the axes x and y (i.e., orthogonal to the image plane 612), the y-deflection angle θ is the angle between the y-axis and the projection of a light beam 610 on the image plane 612, and the z-deflection angle φ is the angle between the z-axis and the projection of the light beam 610 on the x-z plane.

The light-emitting apparatus 600 is similar to the light-emitting apparatus 100 shown in FIG. 4 and comprises a light-emitting layer 104 having one or more LEDs (not shown) and an optical-transformation layer 106 such as a topocentric vector control panel (TVCP) layer in these embodiments, in front of the light-emitting layer 104. Although not shown in FIG. 18, the light-emitting apparatus 600 may also comprise a substrate 102 for supporting the light-emitting layer 104 (similar to the light-emitting apparatus 100 shown in FIG. 4).

The light-emitting layer 104 comprises an array of LEDs as the light source and emits a plurality of light beams 610 passing through the TVCP 106 towards the image plane 612.

The TVCP 106 comprises one or more optical-transformation units 122 (also denoted "lenses" in these embodiments; not shown in FIG. 18) arranged in a predefined pattern with each optical-transformation unit 122 comprising a metasurface. Each optical-transformation unit 122 of the TVCP 106 controls the direction of a light beam 610 passing therethrough by controlling the deflection angles θ and φ thereof to adjust the azimuth, elevation, and angle of the cone of light 610 in the image plane 612.

Figure 2A:
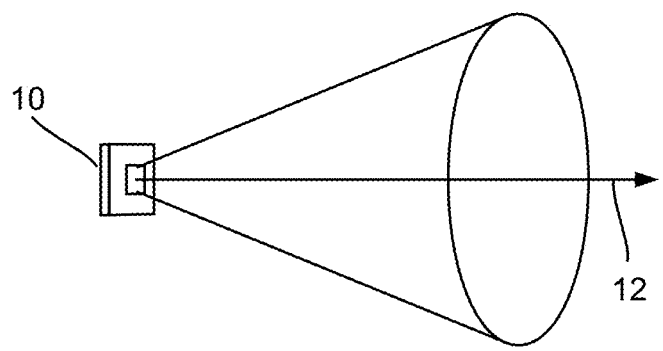
FIG. 2A is a schematic diagram showing a prior-art Light-Emitting Diode (LED) panel emitting a light beam towards a square image plane at a distance thereto.
Figure 2B:
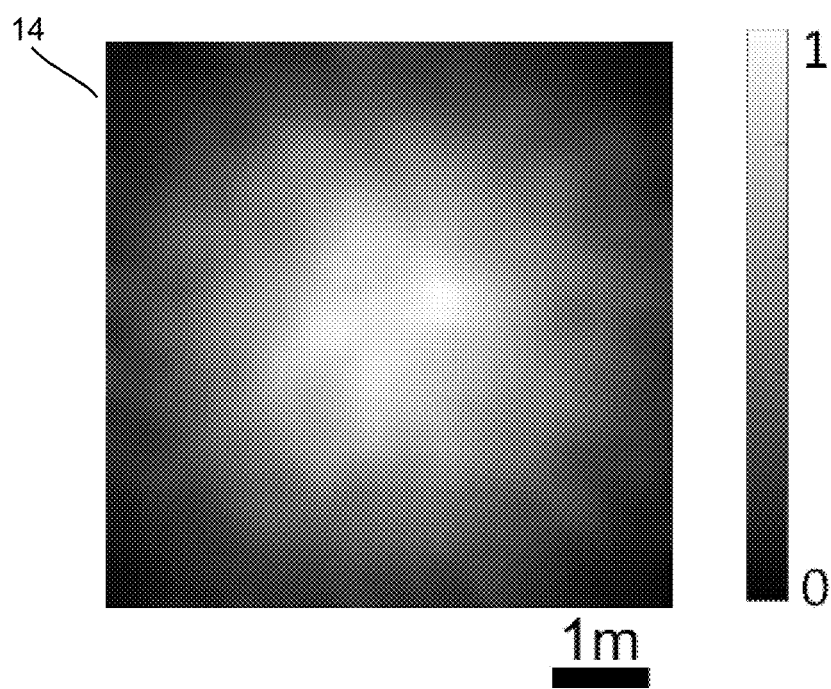
FIG. 2B shows the illumination pattern on the image plane of the light emitted from the prior-art LED panel, obtained using ray-tracing.

The TVCP 106 effectively breaks the symmetry of the light distribution otherwise present on the image plane 612 (see FIG. 2). Moreover, a small change in the deflection angles θ and φ would give rise to significant change in the light-intensity distribution on the image plane 612. Thus, with a carefully configured TVCP 106, the lighting system 600 may use a plurality of light beams emitting from the light-emitting layer 104 through the TVCP 106 towards a plurality of predefined incidence points distributed on the image plane 612 to generate almost any light-intensity distribution in a target illumination area thereon as needed.

The illumination pattern (e.g., the size and shape of the target illumination area and the light-intensity distribution therein) and the number of light sources (e.g., LEDs) determine the locations of the predefined incidence points which may be calculated by using a suitable optimization method to optimize a suitable cost function with the constraint that all incidence points must be within the target illumination area.

For example, to obtain a uniformly distributed (or more precisely, nearly uniformly distributed) light-intensity distribution, a Normalized Mean Square Error (NMSE) of the light-intensity distribution $$NMSE = \frac{\sqrt{\frac{\sum_{i=1}^{N}(I(x_i) - \mu)^2}{N}}}{\sum_{j=1}^{N} I(x_j)} \quad (1)$$

may be used as the cost function where μ is the mean value of the light intensity on the image plane 612, $I(x_i)$ is the light intensity of the i-th pixel, and N is the total number of pixels of the target illumination area on the image plane 612. A suitable optimization method may be used to calculate the deflection angles θ and φ of each light beam 610 (which determine the location of the incidence point thereof) that minimize the NMSE under the constraint that all incidence points must be within the target illumination area.

Figure 19:
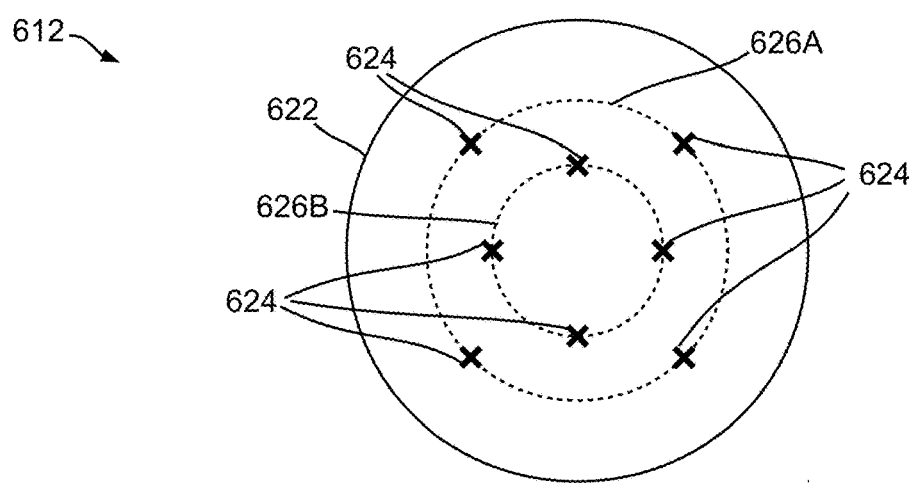
FIG. 19 illustrates an example of forming a cost function used by the lighting system shown in FIG. 18 for generating an illumination pattern.

FIG. 19 illustrates the formation of the cost function in one example wherein a uniform illumination pattern within a circular target illumination area 622 on the image plane 612 is to be generated. Those skilled in the art will appreciate that the cost function for other illumination pattern may be similarly formed.

In the example shown in FIG. 19, the lighting system 600 may use eight (8) light beams emitting towards respective incidence points 624 distributed on two concentric circles 626A and 626B (four points on each circle) within the circular area 622 of the image plane 612 with uniform angular spacing.

Any suitable optimization methods such as an artificial intelligent (AI) algorithm, a machine learning algorithm, a gradient descent (GD) method, a simulated annealing (SA), and/or the like may be used for finding the global (or near-global) minimum of the NMSE of Equation (1) and the corresponding deflection angles θ and φ of each light beam 610.

Figure 20:
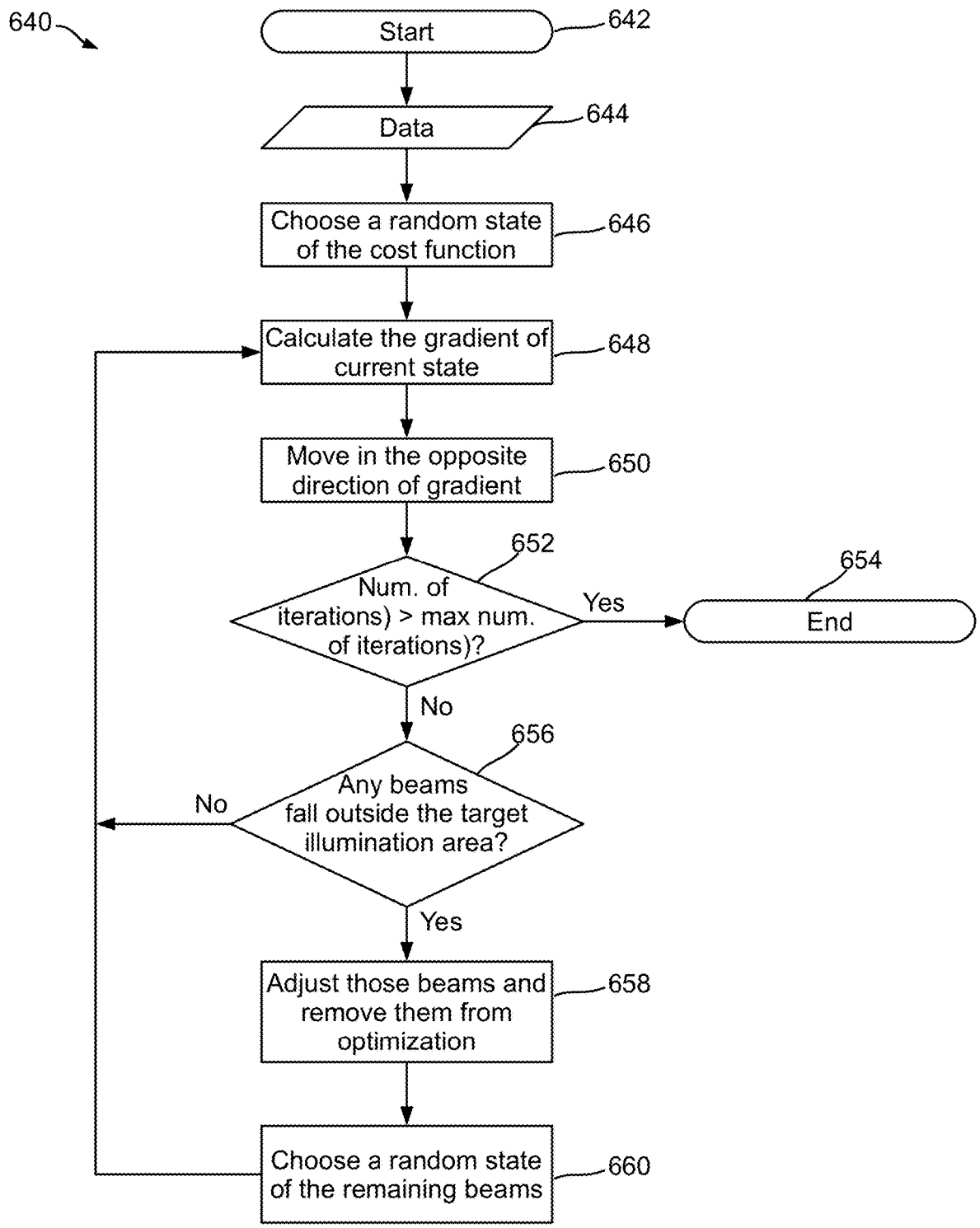
FIG. 20 is a flowchart showing the steps of a process executed by a processing structure of the lighting system shown in FIG. 18 for finding the global (or near-global) minimum of the cost function using a gradient descent method.
Figure 21:
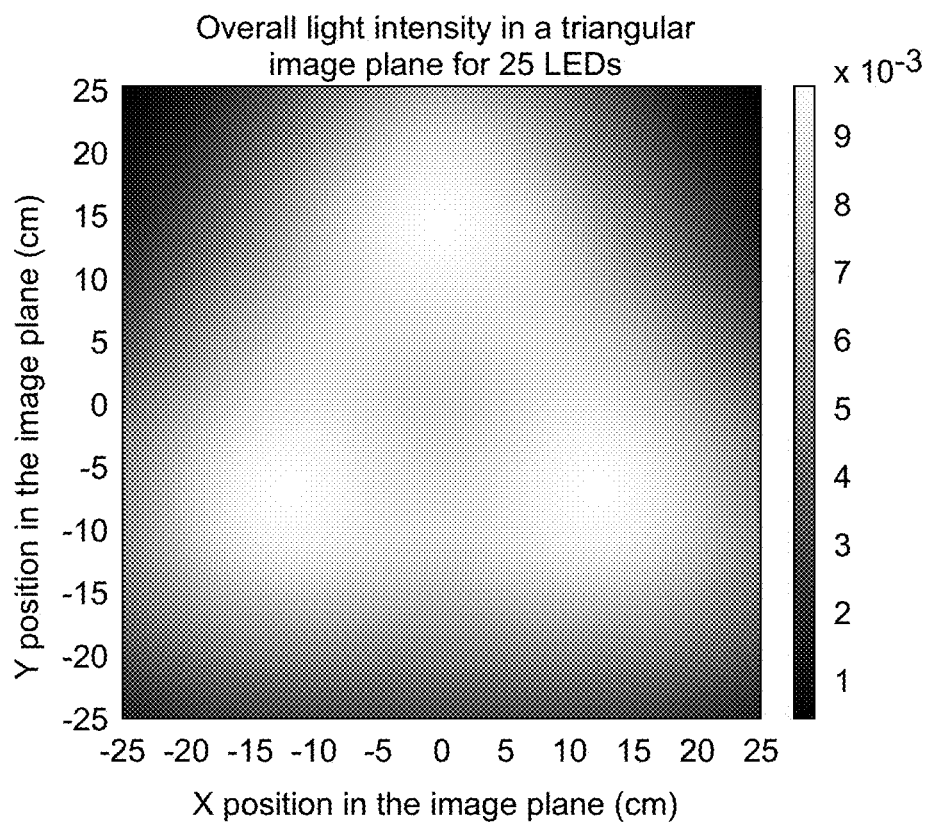
FIGS. 21 to 25 show the optimization results of the process shown in FIG. 20 for generating various illumination patterns.
Figure 22:
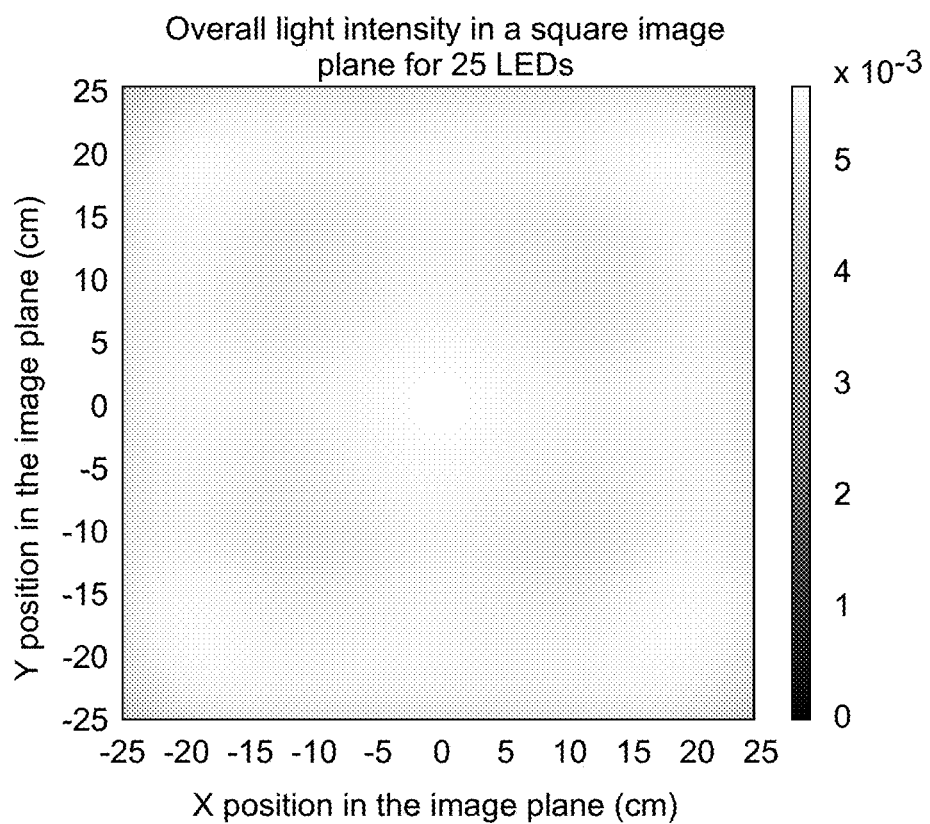
Figure 23:
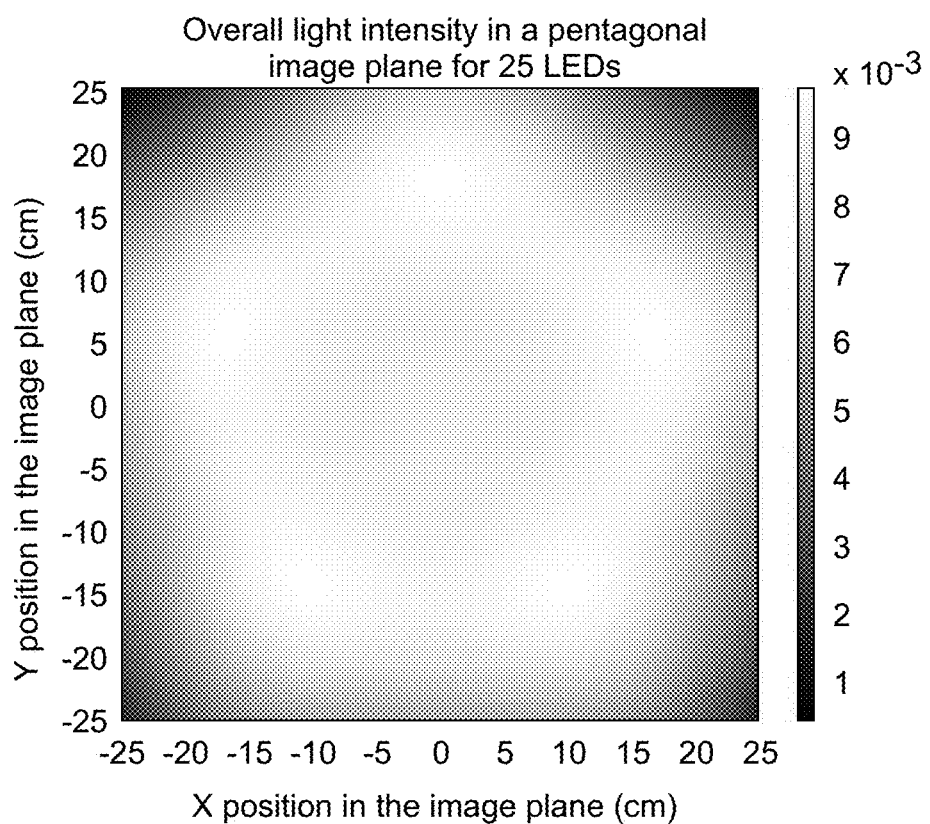
Figure 24:
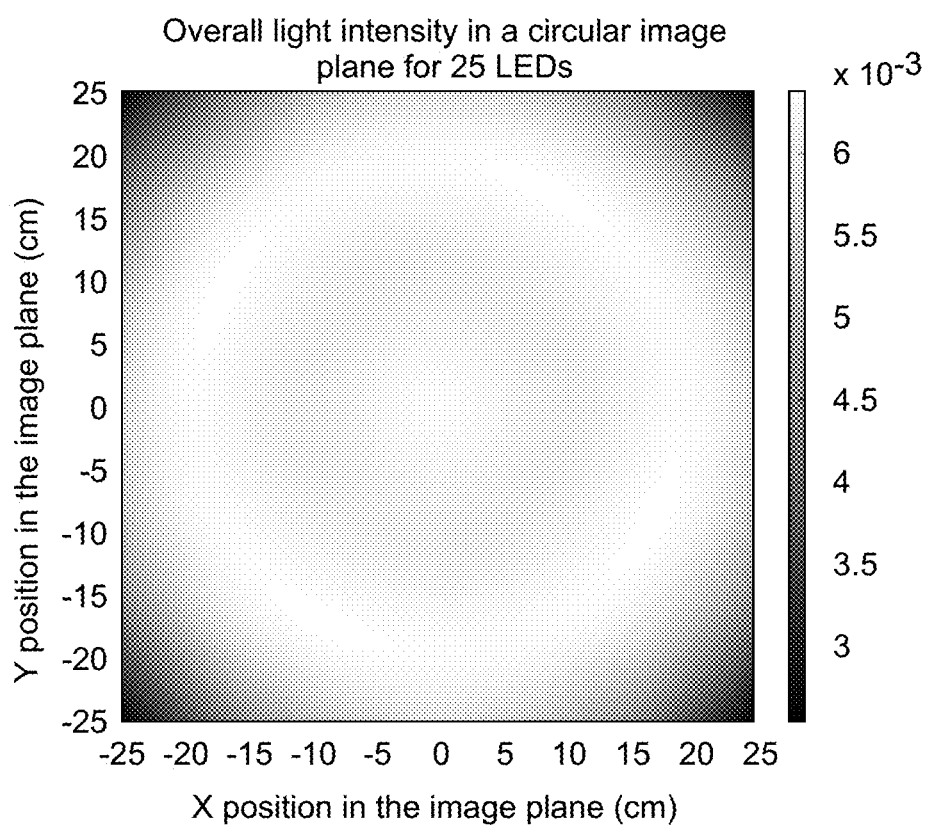

FIG. 20 is a flowchart showing the steps of a process 640 for finding the global (or near-global) minimum of the NMSE of Equation (1) using a GD method which uses the following predefined parameters in the optimization:

Number of LEDs in the light-emitting layer 104;
Direction and angular span of the field of view (FOV) of each LED;
The shape of the target illumination area on the image plane 612
The size of the target illumination area;
Distance between the source and the target illumination area;
Learning rate of GD; and
Maximum number of iterations.

Those skilled in the art will appreciate that the above-described parameters may be customized by the user or determined by the setup of the system 600 before the process 640 starts.

As shown in FIG. 20, after the process 640 starts (step 642), the above-described parameters are loaded (step 644) and an initial state (e.g., an initial set of values for the state variables (θ, φ)) of each light beam 610 is randomly selected (step 646).

At step 648, the gradient of the cost function at the current state with respect to the state variables (θ, φ) of all light beams 610 is calculated. Then, the state variables (θ, φ) of all light beams 610 are "moved" (i.e., changing the values of the state variables (θ, φ)) in the opposite direction of the gradient value of the current state multiplied by the learning rate (step 650).

At step 652, the process 640 checks if the number of iterations has reached the maximum number of iterations (predefined by the system or by a user). If the number of iterations has reached the maximum number of iterations, the optimization has completed and the process 640 then ends (step 654).

If at step 652, the number of iterations has not reached the maximum number of iterations, the process 640 goes to step 656 to check if the incidence point of any light beam 610 is out of the target illumination area. If not, the process 640 goes back to step 648 to further "move" the state variables (θ, φ) of the light beams 610.

If at step 656, it is determined that the incidence points of one or more light beams 610 are out of the target illumination area, then the process 640 recalculates the values of the state variables (θ, φ) of the one or more light beams 610 to locate the incidence points thereof at the border of the target illumination area along the opposite direction of the gradient value, and defines the one or more light beams as fixed beams (i.e., the state variables (θ, φ) thereof would no longer be used for optimization) (step 658). Then, the process 640 randomly selects an initial state (e.g., an initial set of values for the state variables (θ, φ)) of each of the remaining light beams 610 (step 660), and goes back to step 648 for further optimization.

The process 640 may loop through the above-described steps one or more times and, according to the maximum number of iterations, eventually stops the trials and the global (or near-global) minimum of NMSE is achieved. The corresponding values of the state variables (θ, φ) of each light beam 610 are then used for configuring the optical-transformation units 122 of the TVCP 106.

In some embodiments, the optimization process may partition the light beams to a plurality of groups. For example, in the example shown in FIG. 19, the optimization process may partition the light beams to two groups each comprising four light beams whose incidence points are in a circle 626A or 626B. Then, the optimization process may form a cost function wherein the control variables to minimize the NMSE are the radius and degree of rotation of the circles 626A and 626B.

Figure 25:
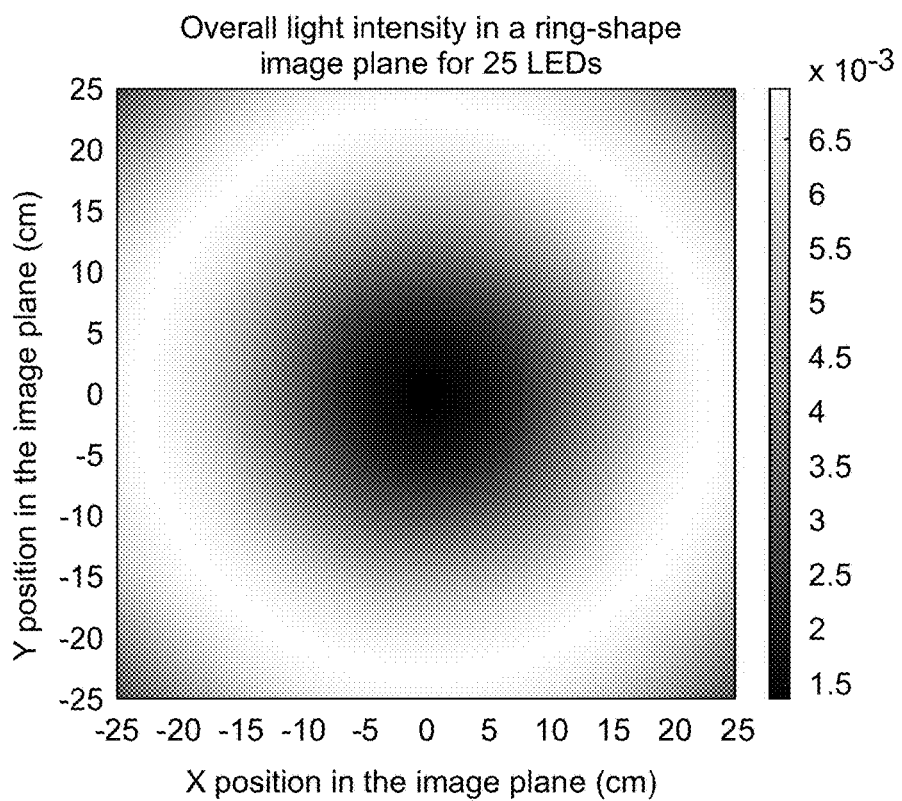

FIGS. 21 to 25 show the optimization results using the GD method for creating uniform light-intensity distribution within target illumination areas of different shapes on the image plane including a triangular illumination-area (FIG. 21), a square illumination-area (FIG. 22), a pentagonal illumination-area (FIG. 23), a circular illumination-area (FIG. 24), and a donut-shape or ring-shape illumination-area (FIG. 25).

Fabrication Techniques of Metasurfaces

The metasurface-based TVCP 106 may be fabricated using any suitable methods such as electron beam lithography. However, this technique is costly and slow rendering it suitable only for the fabrication of small metasurfaces. The TVCP 106 described above usually requires metasurfaces with diameters in centimeter scales and thus the conventional electron beam lithography technique may not be rapid and cost-effective.

In some embodiments, a deep ultraviolet (UV) lithography technique is used for fabricating metasurfaces such as metasurface-based TVCP 106 described above. While the deep UV lithography technique is a well-established technique used in the semiconductor area, to Applicant's knowledge, it has not been used in fabricating metasurfaces.

With this technique, a layer of chromium is deposited on a glass wafer. Then, the wafer is spin-coated with a resist followed by UV exposure and developing. Finally, the metasurface patterns are defined by etching the chromium layer. Such a technique allows fabrication of a plurality of metasurfaces on a large wafer via a single process thereby giving rise to a rapid and cost-effective fabrication. Moreover, the deep UV lithography technique also enables fabrication of metasurfaces for the visible and infrared wavelength ranges using silica, titanium dioxide, or amorphous silicon.

Lighting System with a Uniform Illumination Pattern

As described above, conventional illumination systems such as LED panels used for indoor plant growth usually do not produce a uniform distribution of light over the plants.

Figure 26:
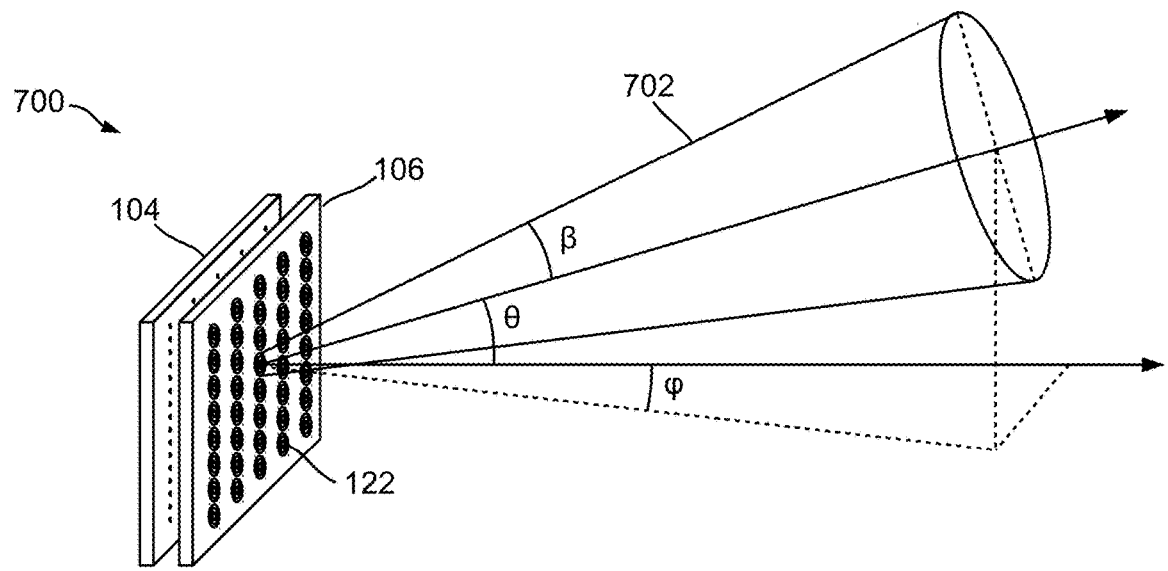
FIG. 26 is a schematic diagram showing the structure of a lighting system for use as an illumination or light source with controlled illumination patterns, according to some embodiments of this disclosure.

In some embodiments similar to those shown in FIGS. 4 and 18, uniform or near-uniform illumination of a lighting system 700 such as a grow light system may be obtained by overlaying an angle-control optical-transformation layer 106 such as a TVCP layer in front of the light-emitting layer 104. As shown in FIG. 26, the light-emitting layer 104 emits a plurality of light beams 702 passing through the TVCP 106 towards an image plane (not shown). The spatial distribution of each light beam 702 may be characterized by the angles β, θ, and φ, wherein the angle β determines the angular span of the light beam 702, and the angles θ and φ determine the direction of the light beam 702.

The TVCP 106 comprises one or more optical-transformation units 122 arranged in a predefined pattern with each optical-transformation unit 122 comprising a metasurface. Each optical-transformation unit 122 of the TVCP 106 is configured for precisely controlling the angles β, θ, and φ of the corresponding light beam 702 to arbitrarily change the angular extent, altitude, and latitude of the cone of light in the image plane. The TVCP 106 effectively breaks the symmetry of the light distribution otherwise present in the image plane (e.g., see FIG. 2). The use of the TVCP 106 is powerful in that a small change in the angles β, θ, and/or p may make significant difference in the intensity distribution in the image plane. Thus, almost any arbitrary intensity distribution may be generated.

The lighting system 700 may be used for generating a uniform illumination pattern at the image plane and may be used as a grow light. It is noted that, for ease of fabrication and implementation, the number of metasurfaces with different designs needs to be minimized.

In some embodiments, the TVCP 106 of a uniform-illumination lighting system 700 may only comprise two types of metasurfaces including a set of splitting metasurfaces, and a set of converging metasurfaces.

The splitting metasurfaces are polarization-sensitive metasurfaces which modify angles β, θ, φ of light beams by directing light of two orthogonal polarization states in opposite directions. In these embodiments, the light-emitting layer 104 (e.g., LED light-emitting layer) emits unpolarized light which ensures equal power split into two opposite directions at the splitting metasurfaces.

Figure 27A:
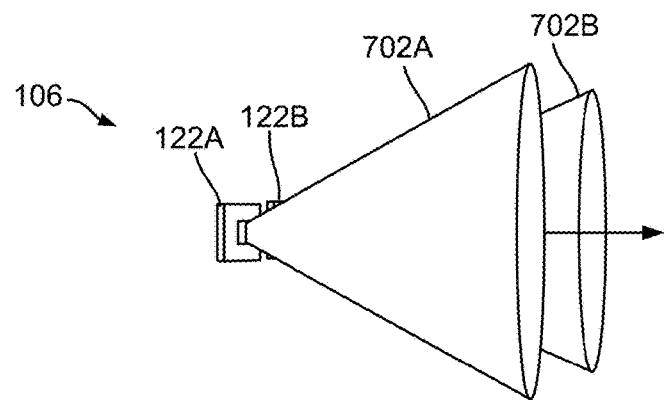
FIG. 27A is a schematic diagram showing the splitting metasurfaces for generating borders of intensity distribution in the image plane.

As shown in FIG. 27A, the splitting metasurfaces 122A and 122B of a TVCP 106 are configured for distributing light beams 702A and 702B, respectively, at the borders of intended illumination pattern on the image plane (not shown).

Figures 27B, 27C:
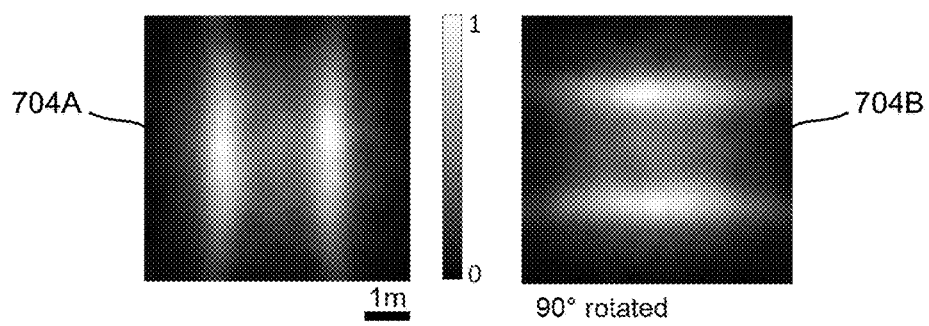
FIG. 27B shows the illumination pattern in the image plane generated by a vertical splitting metasurfaces shown in FIG. 27A, wherein the optical energy is substantively concentrated along the vertical borders of a target area.
FIG. 27C shows the illumination pattern in the image plane generated by a horizontal splitting metasurfaces shown in FIG. 27A, wherein the optical energy is substantively concentrated along the horizontal borders of a target area.

FIG. 27B shows the illumination pattern 704A on the image plane with optical energy significantly distributed along vertical borders (the directed lights are denoted "vertical-border-focused lights" hereinafter), created by using splitting metasurfaces to split the light from the light-emitting layer to vertically direct light to the corresponding borders.

Similarly, FIG. 27C shows the illumination pattern 704B on the image plane with optical energy significantly distributed along horizontal borders (the directed lights are denoted "horizontal border-focused lights" hereinafter), created using 90°-rotated splitting metasurfaces (similar to the splitting metasurfaces used in FIG. 27B but with 90° rotation of the optical energy distribution) to split the light from the light-emitting layer to horizontally direct light to the corresponding borders.

Figure 28:
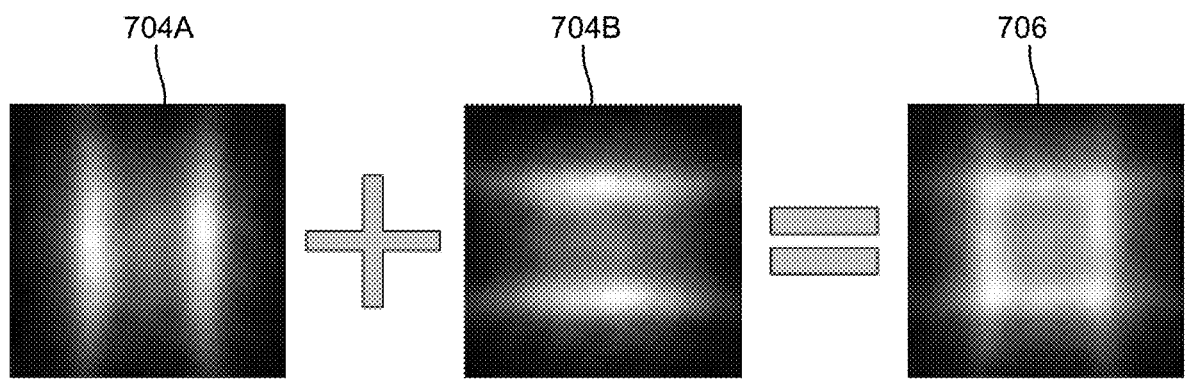
FIG. 28 shows a conceptual representation of a light distribution substantively concentrated along the horizontal and vertical borders of a target area using horizontal and vertical splitting metasurfaces shown in FIG. 27A.

The horizontal/vertical border-focused lights as shown in FIG. 27B may be directed to a same target area on the image plane to allow the lights directed therefrom to overlap and form an illumination pattern 706 with optical energy substantially concentrated along the four borders of the area; see the conceptual representation in FIG. 28.

Figure 29A:
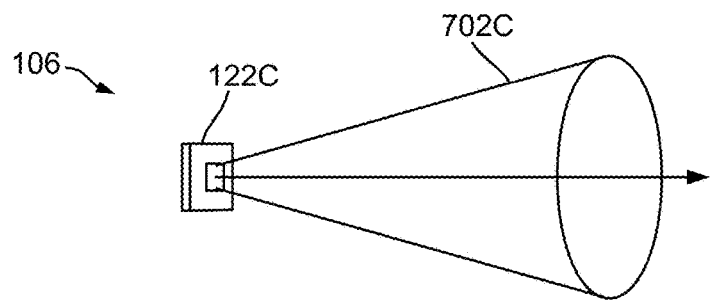
FIG. 29A is a schematic diagram showing the converging metasurfaces for generating a light distribution substantively concentrated at the center of an image plane.
Figure 29B:
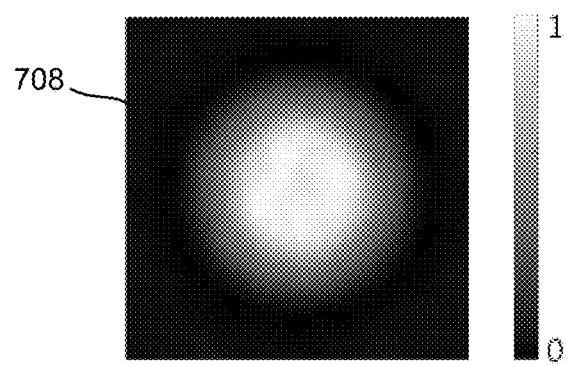
FIG. 29B shows the illumination pattern in the image plane generated by the converging metasurfaces shown in FIG. 29A.

As shown in FIGS. 29A and 29B, converging metasurfaces 122C are configured for modifying angle β of the light beam 702C without any change in the direction of the cone of light beam 702C. Thus the converging metasurfaces 122C distribute light beams 702C at the center of a target area on the image plane thereby creating an illumination pattern with optical energy substantially focused at the center thereof.

Figure 30:
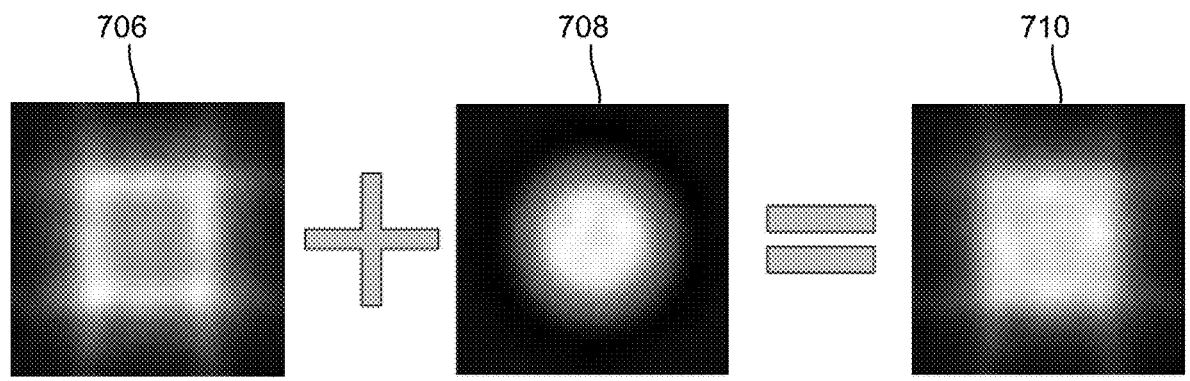
FIG. 30 shows a conceptual representation of a substantially uniform light distribution on an image plane generated the splitting and converging metasurfaces shown in FIGS. 27A and 29A.

As illustrated by the conceptual representation shown in FIG. 30, by using the splitting metasurfaces 122A and 122B and the converging metasurfaces 122C to direct light beams to a same target area, the illumination patterns 706 (which is a combination of illumination patterns 704A and 704B shown in FIG. 28) and 708 may be combined to obtain a uniform light distribution in the target area.

Figure 31:
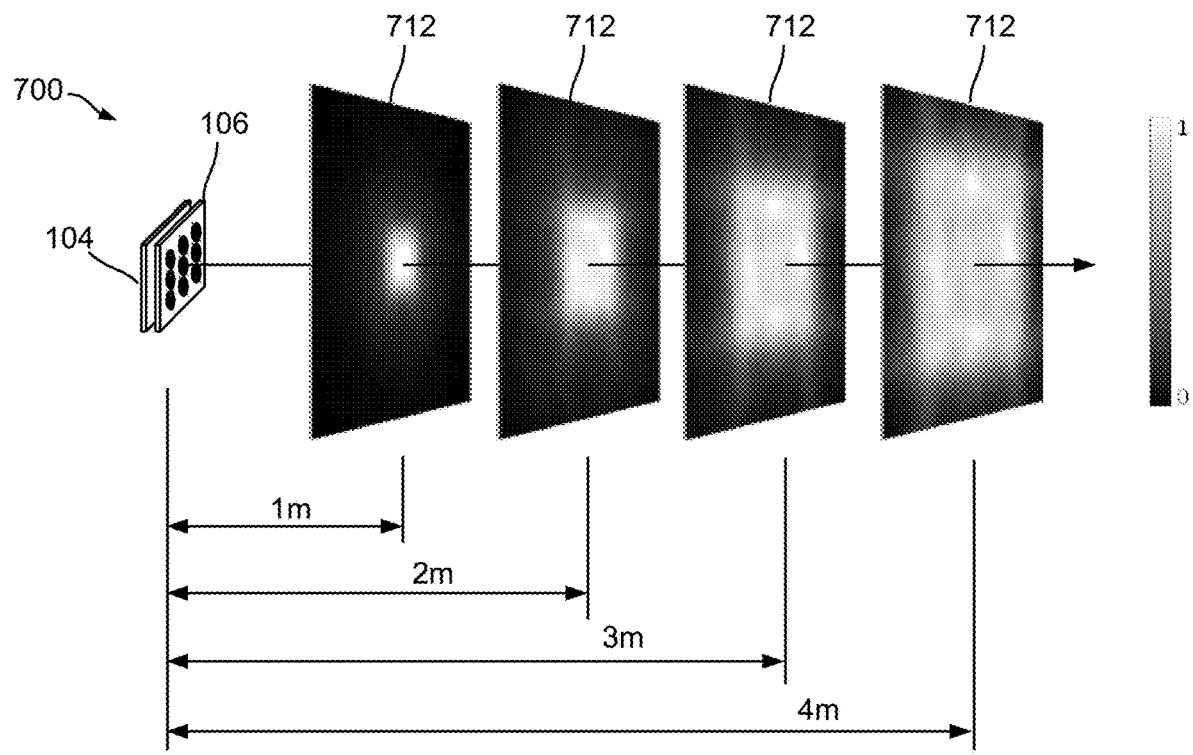
FIG. 31 shows the substantially uniform light distribution on an image plane at different distances.

Such a uniform light distribution is substantially independent of the distance between the metasurface-based TVCP 106 and the image plane 712. As shown in FIG. 31, the light distribution is merely scaled at different distances without compromising the uniformity of distribution.

Figure 32:
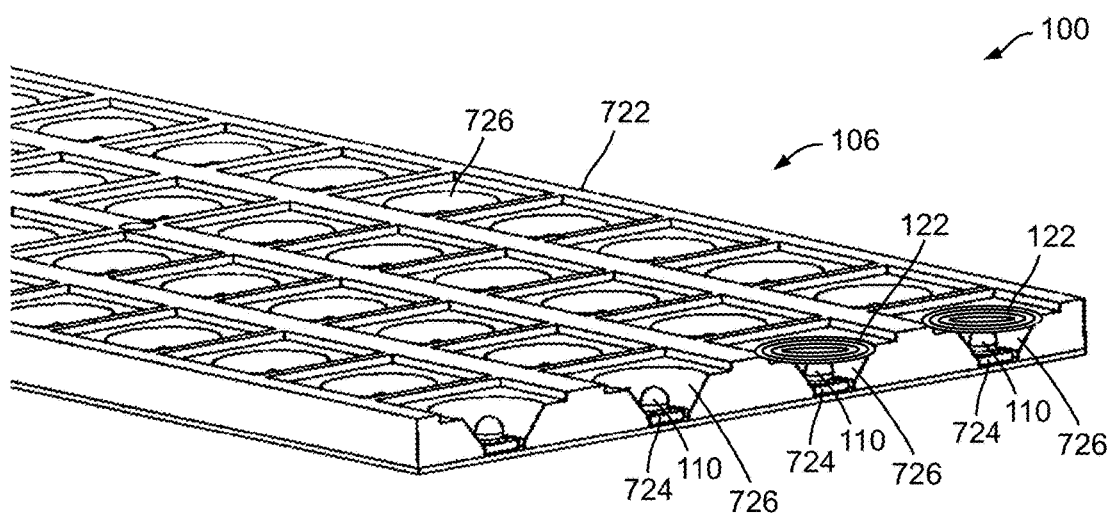
FIG. 32 shows an exemplary implementation of the topocentric vector control panel (TVCP) using an array of metasurfaces, according to some embodiments of this disclosure, the TVCP comprising a metasurface housing coupled to a light-emitting layer, the metasurface housing comprising a plurality of receptacles receiving therein a plurality of metasurface units.

FIG. 32 shows an example implementation of the TVCP 106 using an array of metasurfaces 122. For ease of illustration, only two metasurfaces 122 are shown.

In these embodiments, the TVCP 106 comprises a metasurface housing 722 overlaying the LEDs 110 mounted on a printed circuit board (PCB) 724 of the light-emitting layer 104. The metasurface housing 722 comprises a plurality of receptacles 726 at locations corresponding to the LEDs 110. Each receptacle 726 comprises with an outwardly expanding inner surface having an inner opening for receiving light emitted from the light-emitting layer 104 and an outer opening for passing through the received light, the outer opening having an area greater than that of the inner opening.

Figure 33:
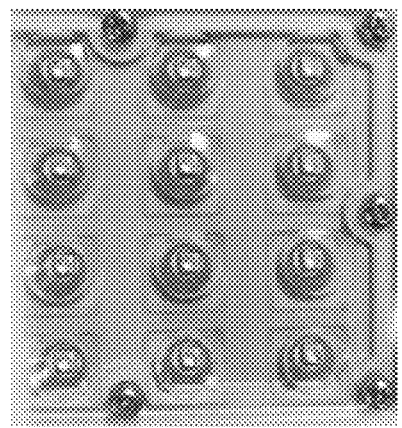
FIG. 33 is a photo showing the metasurface housing coupled to the light-emitting layer of the TVCP shown in FIG. 32.

In these embodiments, the inner surface of the receptacle 726 is reflective for reflecting light rays (emitted from the LED 110 therein) with high angles to contribute to the overall illumination, thereby increasing the efficiency of overall lighting. The maximal light throughput is accomplished when the cross-section of the inner surface is in a paraboloid shape and the LED is located at the foci thereof. FIG. 33 is a photo showing the metasurface housing 722 coupled to the light-emitting layer 104.

A plurality of metasurface units 122 are fixed or otherwise coupled to the receptacles 726 of the metasurface housing 722 using suitable fastening means such as epoxy, glue, and/or the like, thereby ensuring the alignment of LEDs 110 and metasurface units 122.

Polarization-Selective Illumination

Plants are often composed of constituents with organized arrangements. As a result, plants' light absorption is often polarization-sensitive. In other words, plants may absorb more light in one particular polarization state than light in the other polarization state. Therefore, photosynthesis may be optimized using illumination with specific polarization state.

Figure 34:
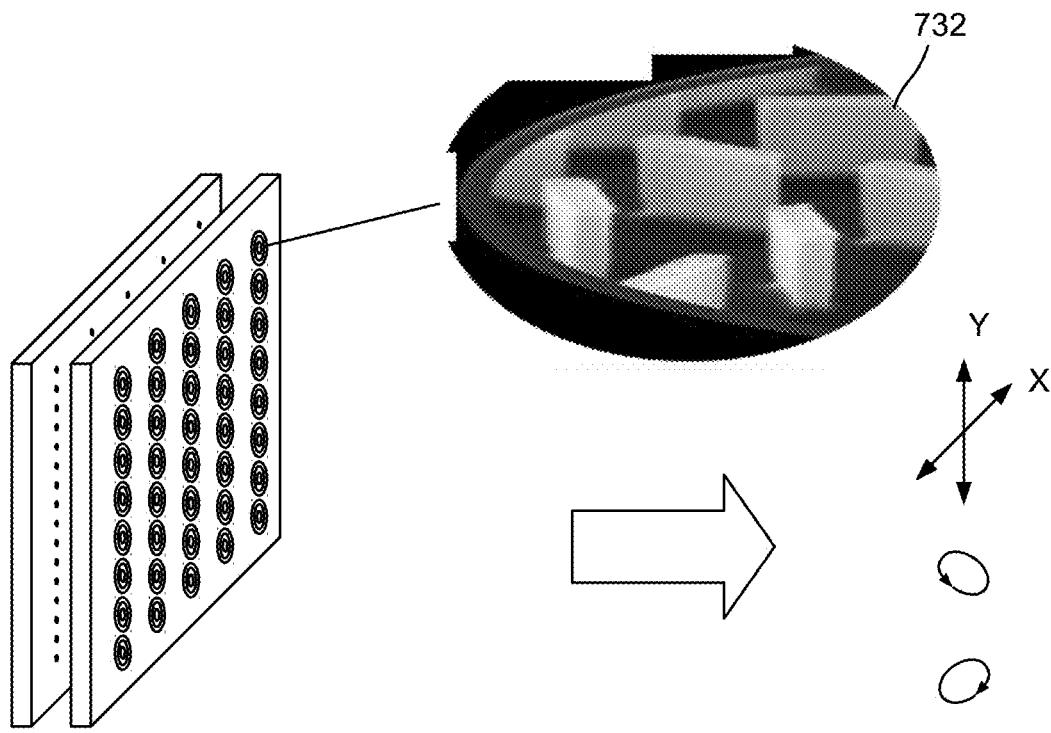
FIG. 34 shows the nano-scale structures of a metasurface having an asymmetric base geometry for illuminating plants with specific polarization states.

In some embodiments, the metasurface-based optical-transformation layer 106 of the grow light disclosed herein may be polarization-selective, which may be implemented by arranging the nano-scale structures 124 of the metasurface to have an asymmetric base geometry 732 as shown in FIG. 34. Thus, a grow light with such a metasurface-based optical-transformation layer 106 may be used for illuminating plants with light of specific polarization state to optimize light for photosynthesis. Generally, the metasurfaces of the optical-transformation layer 106 may be designed to illuminate plants with a variety of polarization states including linear, circular, and in general elliptic polarizations states. Linear polarization illumination may be used for optimizing photosynthesis of plants made of fibers oriented in a specific direction, and circular polarization illumination may be used for optimizing photosynthesis of plants made of constituents with helicity.

Metasurface-Based Tvcp for Photovoltaic Cells

Figure 35:
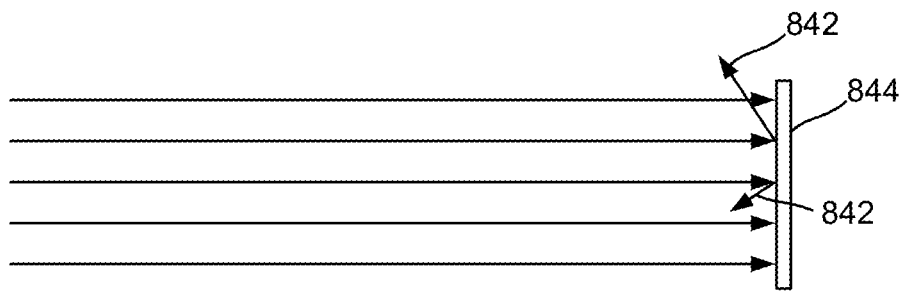
FIG. 35 is a schematic diagram showing light reflections occurred at the surface of prior-art photovoltaic cells.

In solar batteries, while always desirable, a perfect light absorption by the photovoltaic cells thereof is difficult to achieve due to a mismatch between the spectrum of the incident light and the spectral response of the photovoltaic cells. As shown in FIG. 35, light reflections 842 occurred at the surface of the photovoltaic cells 844 also causes loss of solar energy that may otherwise be absorbed by the photovoltaic cells 844.

In some embodiments, the metasurface-based TVCP may be incorporated in photovoltaic panels having, e.g., one or more silicon-based and/or one or more quantum-dot photovoltaic cells, in which the metasurface-based TVCP may be configured to efficiently deliver light of specific wavelengths to the photovoltaic cells. Moreover, the metasurface-based TVCP allows significant size-reduction of photovoltaic panels.

As those skilled in the art will appreciate, metasurfaces comprise nanoscale structures. The geometry and distribution of the nanoscale structures thereof may be designed or otherwise configured for meeting the requirements of a specific application. For example, metasurfaces may be designed to pass or otherwise transmit therethrough a portion of the incident light of a target spectrum and completely reflect the other portion of the incident light out of the target spectrum.

Figure 36:
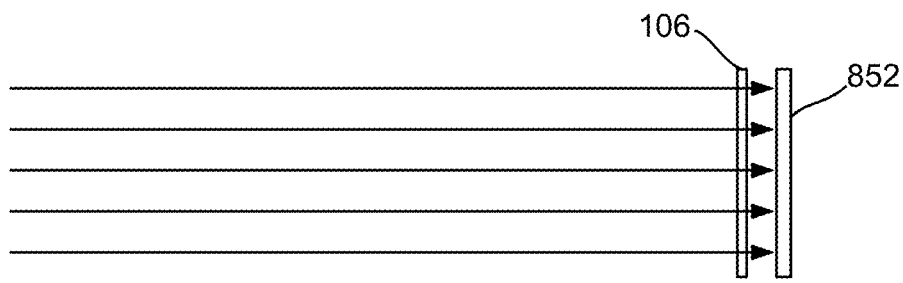
FIG. 36 is a schematic diagram showing a solar-panel apparatus having a metasurface-based topocentric vector control panel (TVCP) in front of a photovoltaic panel for reducing light reflection at the surface of the photovoltaic panel.

In some embodiments as shown in FIG. 36, the metasurface-based TVCP 106 may be arranged in front of a photovoltaic panel 852 having, e.g., one or more silicon-based and/or quantum-dot photovoltaic cells. The metasurface-based TVCP 106 comprises a plurality of metasurface units (not shown) having a spectral response matching that of the photovoltaic cells. Thus, the combination of the metasurface-based TVCP 106 and the photovoltaic panel 852 is significantly more efficient compared to the photovoltaic panel 852 alone because, when the photovoltaic panel 852 is used alone, the spectrum that are not fully absorbed may turn into heat and other unwanted effects that degrade the performance thereof. Such an arrangement or combination is particularly important for indoor photovoltaic cells that harvest optical energy from an artificial lighting source such as LEDs wherein the metasurface units may be designed to match a specific illumination spectrum of the light source and reject other light that cannot be efficiently absorbed by the photovoltaic cells.

Figure 37:
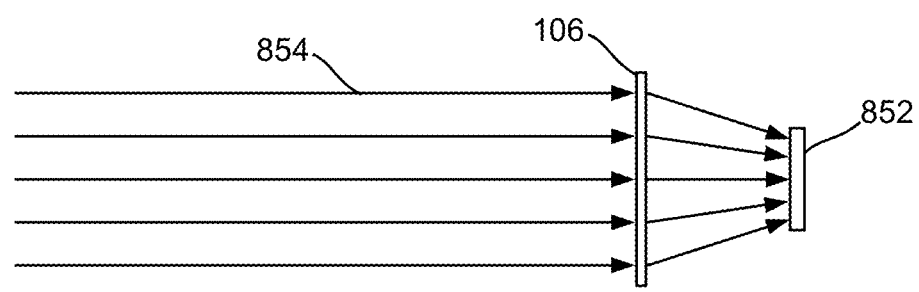
FIG. 37 is a schematic diagram showing a solar-panel apparatus having a metasurface-based TVCP in front of a photovoltaic panel for reducing the size of the photovoltaic panel.
Figure 38:
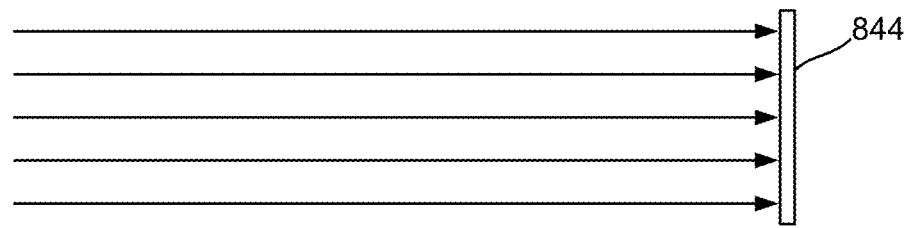
FIG. 38 is a schematic diagram showing a prior-art solar-panel apparatus having a photovoltaic panel without TVCP for comparison with the solar-panel apparatus shown in FIG. 37.

Another important application of metasurfaces lies in their above-described ability to redirect a light ray to a different direction. As shown in FIG. 37, a metasurface-based TVCP 106 in front of may be a photovoltaic panel 852 wherein the metasurface-based TVCP 106 is configured to converge the incoming light rays 854 into a small area of the photovoltaic panel 852 and thus, the size of the photovoltaic panel 852 may be significantly reduced. FIG. 38 shows a prior-art photovoltaic panel 844 without the metasurface-based TVCP 106 for comparison.

Ultra-Directional Screens Using Metasurfaces

Conventional screens or displays usually have wide angular spans of their fields of view (FOVs). However, in some applications, it may be desired to limit the FOV of a display. Herein, the term FOV refers to the angular extent of illumination (e.g., in a cone shape or other shape) emitted from a component (e.g., a LED layer, a metasurface layer, or the like), wherein in various embodiments, the light may be used for illumination or for displaying one or more images. The FOV may be characterized by the direction and three-dimensional (3D) angular span of the light emitted from the component.

Figure 39:
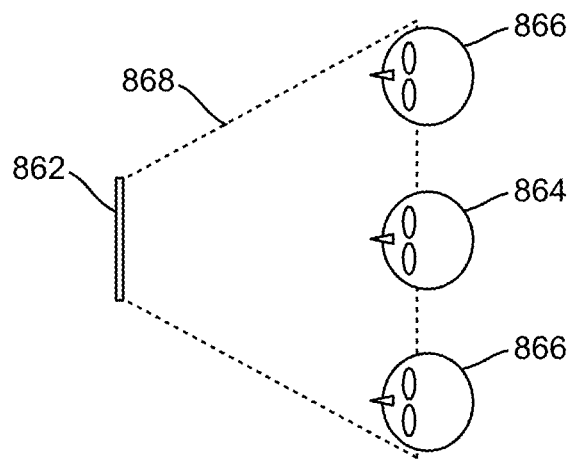
FIG. 39 is a schematic diagram showing a prior-art display having a field of view (FOV) with a wide angular span.

For example, a display in a vehicle or an airplane is generally watched only by an individual. However, as shown in FIG. 39, a display 862 with a wide FOV 868 (i.e., the FOV 868 having a wide angular span) in a vehicle or an airplane (not shown) would unnecessarily emit light to surrounding areas which may result in lowered brightness to the user 864 in front thereof, waste of optical energy, and disturbance to people 866 adjacent thereto.

Similarly, a wide-FOV display used in homes or theatres would light up peripheral areas such as walls and ceiling, leading to lowered brightness to the users in front thereof and waste of optical energy.

Moreover, in some applications requiring enhanced security or privacy such as displays of ATMs, displays in banks, laptop displays with which users are using for sensitive work, may require highly directional displays, as wide-FOV displays in these applications may also cause security or privacy risks in addition to above-described issues of lowered brightness, waste of optical energy, and/or disturbance to people adjacent thereto.

Figure 40:
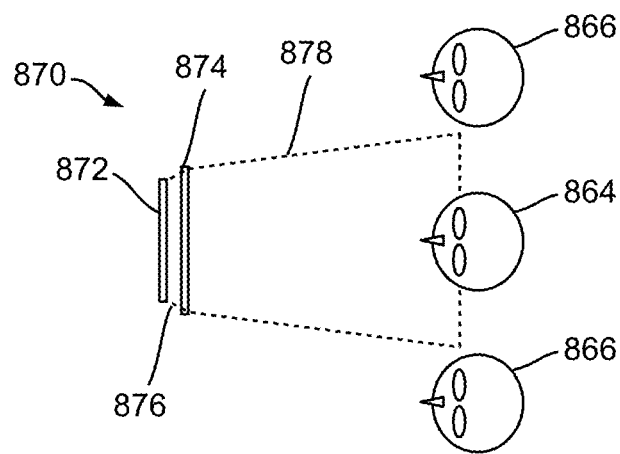
FIG. 40 is a schematic diagram showing an ultra-directional screen or display using metasurfaces, according to some embodiments of this disclosure.

FIG. 40 shows an ultra-directional screen or display 870 using metasurfaces, according to some embodiments of this disclosure. The ultra-directional screen 870 comprises a display or display layer 872 and a metasurface panel or layer 874 in front thereof.

Similar to the optical-transformation layer 106 described before, the metasurface panel 874 comprises a plurality of metasurface units constructed in an array of nanoscale structures that direct light to desired directions so as to restrict the light emitted from the display 872 within a predefined FOV 878 smaller than the FOV 876 of the display 872, thereby creating a virtual visual-barrier so that only the intended person 864 can see the content shown on the display 872.

This ultra-directional screen 870 has a number of advantages including:
- superior brightness due to the concentrated distribution of light energy into a smaller area;
- improved power-efficiency due to the avoidance of illuminating unintended areas and uniform distribution of light energy onto the intended area; and
- enhanced security and privacy as visual information can only be viewed by the intended person in front thereof.

As described above, metasurfaces may be designed to interact differently with light of different polarization states, which is accomplished by fabricating the nanostructures of the metasurfaces with an asymmetric geometry.

Figure 41:
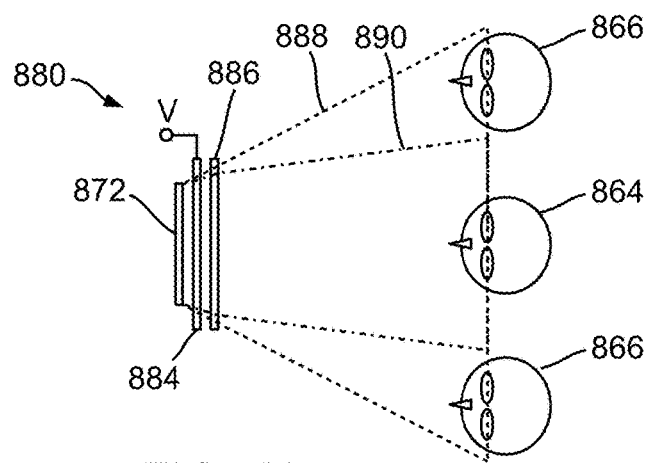
FIG. 41 is a schematic diagram showing a variable-fields-of-view (VFOV) screen or display, according to some embodiments of this disclosure.

FIG. 41 shows a variable-fields-of-view (VFOV) screen or display 880 in some embodiments. The MFOV display 880 comprises a display 872, a polarization control panel 884 in front of the display 872, and a polarization-sensitive metasurface panel 886 in front of the polarization control panel 884.

In these embodiments, the polarization control panel 884 may be implemented using liquid crystal polarization rotators and is controlled by an adjustable control signal V for controlling the polarization of the light emitted from the display 872 to either one of the two orthogonal polarization states.

While the MFOV display 880 is similar to the light-emitting apparatus or display 200 shown in FIGS. 11A, and 11B, the MFOV display 880 in these embodiments does not direct lights with different polarization states to FOVs of different directions as the light-emitting apparatus or display 200 shown in FIGS. 11A, and 11B does. Rather, the polarization-sensitive metasurface panel 886 in these embodiments interacts with the polarized light for directing the light in a first polarization state to a first FOV with a first angular span 888 and directing the light in a second polarization state to form a second FOV with a second angular span 890. For example, the first angular span 888 may be a wide angular span suitable for multiple users 864 and 866 about the MFOV display 880 to view the displayed content, and the second angular span 890 may a narrow angular span smaller than the firs angular span 888 for only allowing the user 864 to view the displayed content.

In above embodiment, the polarization control panel 884 polarizes all light passing therethrough into the first polarization state when the control signal is at a first voltage, and polarizes all light passing therethrough into the second polarization state when the control signal is at a second voltage. In this way, the user 864 may switch the FOV of the MFOV display 880 between the first and second angular spans for sharing the displayed content to people adjacent thereto and for creating a virtual visual barrier to prevent other people from viewing the displayed content, respectively.

Figure 42:
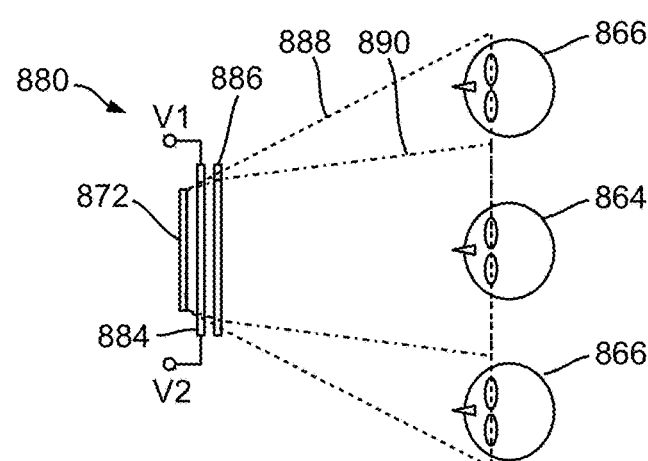
FIG. 42 is a schematic diagram showing a VFOV screen or display, according to some other embodiments of this disclosure.

In another embodiment shown in FIG. 42, the MFOV display 880 is similar to the display described in FIGS. 10A and 10B. Specifically, the display 872 comprises two sets units (pixels or subpixels, depending on the design) wherein each set of units may be used for displaying an image.

Correspondingly, each of the polarization control panel 884 and the polarization-sensitive metasurface panel 886 also comprises two sets units corresponding to the two sets of units of the display 872. Each set of units of the polarization control panel 884 is controlled by a separate control signal V1 or V2, and each set of units of the polarization-sensitive metasurface panel 886 matches a specific polarization state and directs the light with the polarization state to a specific FOV.

Therefore, the display 872 may use the two sets of pixels/units to simultaneously display two images and polarization control panel 884 polarizes the lights of the first and second images into a first and a second polarization states. Then, the polarization-sensitive metasurface panel 886 directs the light in the first polarization state (i.e., the first image) to a first FOV with a wide angular span for sharing the first image with multiple people 864 and 866 and the light in the second polarization state (i.e., the second image) to a second FOV with a narrow angular span for preventing people 866 from viewing the second image.

Figure 43A:
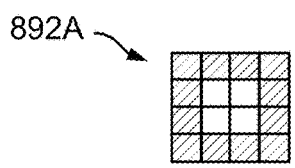
FIGS. 43A to 43G show an example of using the VFOV screen shown in FIG. 42 to simultaneously display two images with a first image being displayed in a first FOV having a wide angular span and a second image being displayed in a second FOV having a narrow angular span such that the second image is invisible to users located only in the first FOV.
Figure 43B:
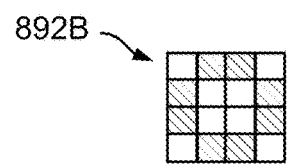

For example, as shown in FIGS. 43A and 43B, the display is to simultaneously display two images 892A and 892B with the image 892A to be displayed in a first FOV of a wide angular span and the image 892B to be displayed in a second FOV of a narrow angular span.

Figure 43C:
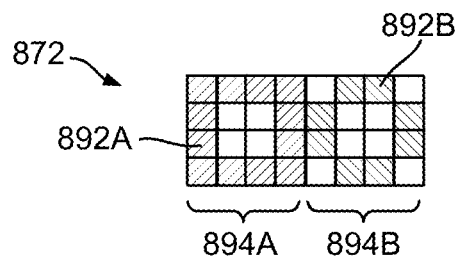

As shown in FIG. 43C, the display 872 partitions the pixels into a first set of pixels 894A and a second set of pixels 894B arranged side-by-side for displaying the images 892A and 892B simultaneously and side-by-side.

Figure 43D:
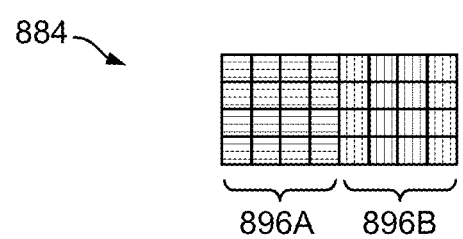

As shown in FIG. 43D, the polarization control panel 884 comprises a plurality of polarization units 894 corresponding to the pixels of the display 872 with a first set of polarization units 896A corresponding to the first set of pixels 894A for polarizing lights passing therethrough to a first polarization state and a second set of polarization units 896B corresponding to the second set of pixels 894B for polarizing lights passing therethrough to a second polarization state.

Figure 43E:
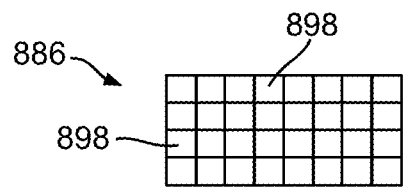

As shown in FIG. 43E, the polarization-sensitive metasurface panel 886 comprises a plurality of metasurface units 898 corresponding to the polarization units 894 of the polarization control panel 884 and directing lights passing therethrough in the first polarization state to the first FOV (having a wide angular span) and directing lights passing therethrough in the second polarization state to the second FOV (having a narrow angular span).

Figure 43F:
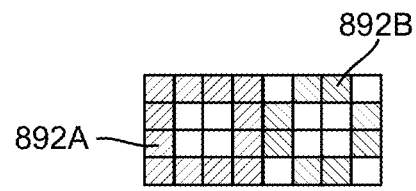
Figure 43G:
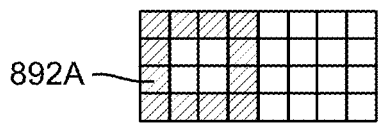

As a result, the first image 892A is directed to the first FOV and the second image 892B is directed to the second FOV. As shown in FIG. 43F, the images 892A and 892B are visible to the user 864 located in both the first and second FOVs, and the users 866 located only in the first FOV (with wide angular span) can only see the first image 892A. In other words, the image 892B is invisible to the users 866 located only in the first FOV.

Three-Dimensional (3D) Display Using Metasurfaces

Figure 44:
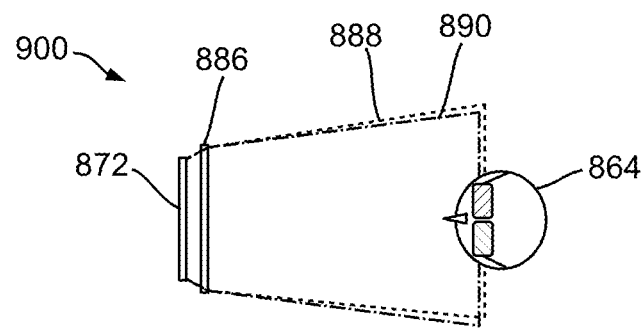
FIG. 44 is a schematic diagram showing a three-dimensional (3D) display using metasurfaces viewable with glasses having polarized lenses, according to some embodiments of this disclosure.

FIG. 44 shows a 3D display 900 using metasurfaces, according to some embodiments of this disclosure. As shown, the 3D display 900 comprises a display 872 and a polarization-sensitive metasurface panel 886 in front thereof. The display 872 displays an image by emitting unpolarized light (which generally comprises both polarization states). The polarization-sensitive metasurface panel 886 is configured to direct the light in the first polarization state into a first FOV 888 and the light in the second polarization state into a second FOV 890 laterally slightly offset from the first FOV 888. A user 864 wearing a pair of glasses with lenses polarized to different polarization states then sees a first image in one eye and a second image in the other eye wherein the second image is of slight perspective distortion from the first image, thereby creating a 3D perception of the displayed image.

In some embodiments, the 3D display 900 may also comprise a polarization control panel 884 sandwiched between the display 872 and the polarization-sensitive metasurface panel 886. The polarization control panel 884 alternately polarizes the light from the display 872 to the first and second polarization states in operation.

Figure 45:
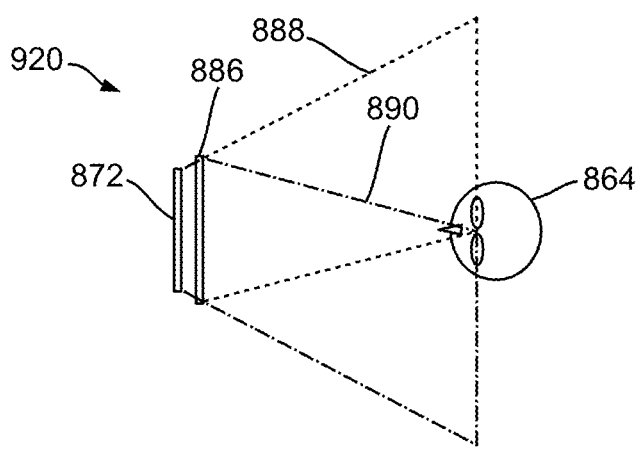
FIG. 45 is a schematic diagram showing a 3D display using metasurfaces viewable without any glasses having polarized lenses, according to some embodiments of this disclosure.

FIG. 45 shows a 3D display 920 using metasurfaces, according to some embodiments of this disclosure. The 3D display 920 is similar to that shown in FIG. 44. However, the polarization-sensitive metasurface panel 886 is configured to direct the light in the first polarization state into a first FOV 888 that only covers a first eye of the user 864 and the light in the second polarization state into a second FOV 890 hat only covers a second eye of the user 864. Therefore, the user 864, without wearing a pair of glasses with polarized lenses, may see a first image in one eye and a second image in the other eye wherein the second image is of slight perspective distortion from the first image, thereby creating a 3D perception of the displayed image.

In some embodiments, the 3D display 920 may also comprise a polarization control panel 884 sandwiched between the display 872 and the polarization-sensitive metasurface panel 886. The polarization control panel 884 alternately polarizes the light from the display 872 to the first and second polarization states in operation.

Solar-Cell Angle Correction

In prior art, a solar panel may experience a sunlight reflection issue.

Figure 46:
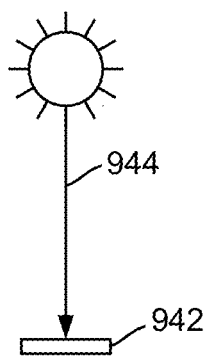
FIGS. 46 and 47 are schematic diagrams showing a prior-art solar panel having light reflection issues.

As those skilled in the art understand, the sunlight incident angle may have significant impact to the efficiency of photovoltaic cells. As shown in FIG. 46, the photovoltaic cells of a solar panel 942 are of the highest efficiency when the sunlight 944 impinges the photovoltaic cells perpendicularly.

Figure 47:
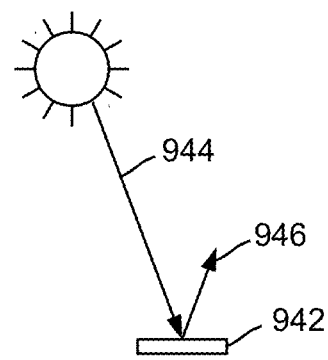

As shown in FIG. 47, at a different time when the sunlight 944 becomes at a non-perpendicular angle to the photovoltaic cells of the solar panel 942, a portion 946 of the sunlight is reflected and the efficiency of the photovoltaic cells is reduced. Thus, the photovoltaic cells of a fixed solar panel would have different efficiency at different times of a day and at different days of a year. While sun tracking systems have been used for improving the efficiency of photovoltaic panels by rotating the solar panel to follow the sun, such systems require tracking systems and moving parts, rendering them expensive in manufacturing and use.

Figure 48:
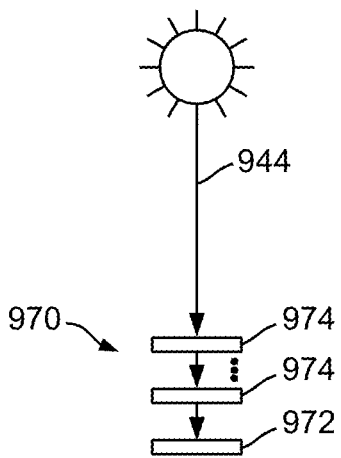
FIGS. 48 and 49 are schematic diagrams showing a solar panel using metasurfaces for alleviating or eliminating the light reflection issues, according to some embodiments of this disclosure.
Figure 49:
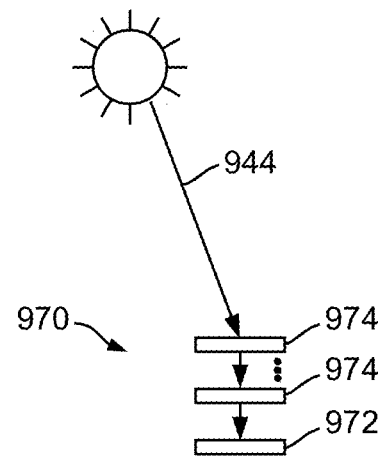

FIGS. 48 and 49 show a solar-energy harvesting apparatus 970 which comprises a solar panel 972 having one or more photovoltaic cells and a plurality of TVCPs 974 in front thereof. By using polarization sensitive metasurfaces where the response of each TVCP 974 may vary using an embedded polarization control panel, the plurality of TVCPs 974 may change the direction of sunlight 944 such that the incident sunlight 944 at an incident angle within a predefined range becomes perpendicular to the photovoltaic cells when impinging the solar panel 972, thereby improving the efficiency without the need of a sun-tracking system or moving parts.

In some embodiments described above, the light-emitting apparatus and/or system is used for plant growth such as for indoor or outdoor plant growth. However, those skilled in the art will appreciate that the light-emitting apparatus and/or system disclosed herein may be alternatively used in other applications such as street lights.

Although embodiments have been described above with reference to the accompanying drawings, those of skill in the art will appreciate that variations and modifications may be made without departing from the scope thereof as defined by the appended claims.

What is claimed is:

1. A light-emitting apparatus comprising:
   a polarization-control layer comprising a plurality of first pixels each for polarizing light emitted from a light-emitting layer and passing the polarized light therethrough; and
   at least one optical-transformation layer each comprising a plurality of second pixels each corresponding to a respective first pixel and comprising a polarization-selective metasurface for selectively passing therethrough the polarized light from the corresponding first pixel that is polarized in a predefined polarization state.

2. The light-emitting apparatus of claim 1, wherein each of the one or more metasurfaces comprises a plurality of nano-scale structures arranged in an asymmetric base geometry.

3. The light-emitting apparatus of claim 1, wherein the light-emitting apparatus is a grow light for facilitating growth of one or more plants.

4. The light-emitting apparatus of claim 1, wherein the polarization-selective metasurface of each second pixel is configured for selectively passing therethrough the polarized light from the polarization-control layer for switching between different illumination patterns or images.

5. The light-emitting apparatus of claim 1, wherein the polarization-selective metasurface of each second pixel is configured for selectively passing therethrough the polarized light from the polarization-control layer for creating multiple different illumination patterns or images at different locations.

6. The light-emitting apparatus of claim 1, wherein the metasurface of each second pixel is configured for adjusting one or more parameters of the polarized light from the polarization-control layer.

7. The light-emitting apparatus of claim 6, wherein the metasurface of each second pixel is configured for adjusting the one or more parameters of the polarized light from the polarization-control layer for optimizing illumination configurations for facilitating growth of one or more plants.

8. The light-emitting apparatus of claim 6, wherein the metasurface of each second pixel is configured for adjusting the one or more parameters of the polarized light emitted from the polarization-control layer for displaying one or more images.

9. The light-emitting apparatus of claim 6, wherein the metasurface of each second pixel is configured for adjusting the one or more parameters of the polarized light from the polarization-control layer for directing the polarized light towards a target area for forming a predefined light-distribution pattern.

10. The light-emitting apparatus of claim 9, wherein the predefined light-distribution pattern is a substantively uniform optical-energy distribution on the target area.

11. The light-emitting apparatus of claim 10, wherein the plurality of metasurfaces comprise a first set of metasurfaces for directing the polarized light from the polarization-control layer towards borders of the target area, and a second set of metasurfaces for directing the polarized light from the polarization-control layer towards a center of the target area, for generating the substantively uniform optical-energy distribution on the target area.

12. The light-emitting apparatus of claim 10, wherein the plurality of metasurfaces comprise a first set of metasurfaces for directing the polarized light from the polarization-control layer towards a first set of borders of the target area, and a second set of metasurfaces for directing the polarized light from the polarization-control layer towards a second set of borders of the target area, for generating the substantively uniform optical-energy distribution on the target area.

13. The light-emitting apparatus of claim 1,
wherein each first pixel comprises a plurality of first subpixels for polarizing the light emitted from the light-emitting layer to different polarization states and passing the polarized light therethrough; and/or
wherein each second pixel comprises a plurality of second subpixels for selectively passing therethrough the polarized light from the corresponding first pixel that is polarized in different polarization states.

14. The light-emitting apparatus of claim 1,
wherein each first pixel is switchable for polarizing the light emitted from the light-emitting layer to different polarization states and passing the polarized light therethrough; and/or
wherein each second pixel is switchable for selectively passing therethrough the polarized light from the corresponding first pixel that is polarized in different polarization states.

* * * * *